United States Patent
Guo et al.

(10) Patent No.: US 11,921,751 B2
(45) Date of Patent: Mar. 5, 2024

(54) TECHNOLOGIES FOR DATA CAPTURE AND DATA ANALYSIS

(71) Applicant: BEULAHWORKS, LLC, Valparaiso, IN (US)

(72) Inventors: Site Guo, Hammond, IN (US); Robert E. Johnson, Crown Point, IN (US); Blaine Robert Hilton, Eugene, OR (US); David A. Nevill, Valparaiso, IN (US)

(73) Assignee: BEULAHWORKS, LLC, Valparaiso, IN (US)

( * ) Notice: Subject to any disclaimer, the term of this patent is extended or adjusted under 35 U.S.C. 154(b) by 433 days.

(21) Appl. No.: 17/113,459

(22) Filed: Dec. 7, 2020

(65) Prior Publication Data

US 2021/0117445 A1 Apr. 22, 2021

Related U.S. Application Data

(63) Continuation of application No. 15/677,832, filed on Aug. 15, 2017, now Pat. No. 10,891,310, which is a
(Continued)

(51) Int. Cl.
*G06F 16/28* (2019.01)
*G06F 16/22* (2019.01)
(Continued)

(52) U.S. Cl.
CPC ............ *G06F 16/282* (2019.01); *G06F 16/22* (2019.01); *G06F 16/2428* (2019.01); *G06F 16/258* (2019.01)

(58) Field of Classification Search
CPC .... G06F 16/282; G06F 16/22; G06F 16/2428; G06F 16/258
See application file for complete search history.

(56) References Cited

U.S. PATENT DOCUMENTS 5,978,811 A 11/1999 Smiley
6,339,776 B2 1/2002 Dayani-Fard et al.
(Continued)

FOREIGN PATENT DOCUMENTS

CN 102819600 A 12/2012
CN 102855290 A 1/2013
(Continued)

OTHER PUBLICATIONS

K, Nakamura et al., "On the Framework for Network Managment as a Service—The perfSONAR-based integrated network management," IEICE Technical Report IA2009-1, The Institute of Electronics, Information and Communication Engineers, 2009.
(Continued)

*Primary Examiner* — Truong V Vo
(74) *Attorney, Agent, or Firm* — Barnes & Thornburg LLP

(57) ABSTRACT

Technologies for data capture and data analysis include a system having a knowledge repository in which all input data is stored as objects and relationships between objects, and each object represents at least one container of one or more properties. The knowledge repository is capable of storing the input data according to more than one storage format. The system may also include a user interface providing an input mechanism to obtain the input data, object information that defines one or more of the properties, and relationship information that defines one or more of the relationships. The system includes a controller configured to receive the input data, the object information, and the relationship information from the user interface and to cause the input data to be stored in the knowledge repository as at least one object based on the object information and the relationship information.

43 Claims, 4 Drawing Sheets

Related U.S. Application Data continuation of application No. 15/095,689, filed on Apr. 11, 2016, now Pat. No. 9,792,347, which is a continuation of application No. 14/211,727, filed on Mar. 14, 2014, now Pat. No. 9,430,549.

(60) Provisional application No. 61/787,177, filed on Mar. 15, 2013.

(51) Int. Cl.
*G06F 16/242* (2019.01)
*G06F 16/25* (2019.01)

(56) References Cited

U.S. PATENT DOCUMENTS

| | | |
|---|---|---|
| 6,567,814 B1 | 5/2003 | Bankier et al. |
| 7,430,732 B2 | 9/2008 | Cwalina et al. |
| 7,480,916 B2 | 1/2009 | Beisiegel et al. |
| 7,490,073 B1 | 2/2009 | Qureshi et al. |
| 7,676,785 B2 | 3/2010 | Loksh et al. |
| 7,721,258 B2 | 5/2010 | Chamberlain et al. |
| 7,802,234 B2 | 9/2010 | Sarukkai et al. |
| 7,921,417 B2 | 4/2011 | Bartsch et al. |
| 7,949,634 B2 | 5/2011 | Freedman |
| 8,201,138 B2 | 6/2012 | Adams et al. |
| 8,312,440 B2 | 11/2012 | Iwama et al. |
| 8,352,388 B2 | 1/2013 | Estes |
| 8,401,980 B2 | 3/2013 | Hatami-Hanza |
| 8,434,068 B2 | 4/2013 | Wrighton et al. |
| 8,567,814 B2 | 10/2013 | Crittenden |
| 2002/0023158 A1 | 2/2002 | Polizzi et al. |
| 2002/0026471 A1 | 2/2002 | Bent et al. |
| 2003/0135850 A1 | 7/2003 | Miloushev et al. |
| 2003/0158842 A1 | 8/2003 | Levy et al. |
| 2004/0093331 A1 | 5/2004 | Garner et al. |
| 2004/0189716 A1 | 9/2004 | Paoli et al. |
| 2006/0225028 A1 | 10/2006 | Lau et al. |
| 2007/0011147 A1* | 1/2007 | Falkenberg ............ G06F 16/33 |
| 2007/0026242 A1 | 2/2007 | Holland et al. |
| 2007/0055656 A1 | 3/2007 | Tunstall-Pedoe |
| 2008/0091743 A1 | 4/2008 | Goff |
| 2008/0244418 A1 | 10/2008 | Manolescu et al. |
| 2009/0013176 A1 | 1/2009 | Bawa |
| 2009/0088254 A1* | 4/2009 | Courage ................. A63F 13/12 |
| | | 463/43 |
| 2009/0100405 A1 | 4/2009 | Belenky et al. |
| 2009/0210855 A1 | 8/2009 | Ramanathan |
| 2009/0276752 A1 | 11/2009 | Sharma |
| 2010/0107136 A1 | 4/2010 | Fildebrandt et al. |
| 2010/0306272 A1 | 12/2010 | Williamson |
| 2011/0137853 A1 | 6/2011 | Mackay |
| 2011/0209114 A1 | 8/2011 | Andersen |
| 2011/0252163 A1 | 10/2011 | Villar et al. |
| 2011/0264967 A1 | 10/2011 | Lovy et al. |
| 2011/0296419 A1 | 12/2011 | Dumas et al. |
| 2012/0036457 A1 | 2/2012 | Perlman et al. |
| 2012/0079451 A1 | 3/2012 | Halbedel et al. |
| 2012/0151436 A1 | 6/2012 | Ahadian et al. |
| 2012/0159432 A1 | 6/2012 | Ahadian et al. |
| 2012/0174061 A1 | 7/2012 | McCollum et al. |
| 2012/0233134 A1 | 9/2012 | Barton et al. |
| 2012/0233594 A1 | 9/2012 | Hariharan et al. |
| 2012/0271785 A1 | 10/2012 | Albertson et al. |
| 2012/0303660 A1 | 11/2012 | Betzler et al. |
| 2012/0311519 A1 | 12/2012 | Kennaley |
| 2012/0317077 A1 | 12/2012 | Chung |
| 2012/0317149 A1 | 12/2012 | Jagota et al. |
| 2013/0066824 A1 | 3/2013 | Khosravy |
| 2013/0097136 A1 | 4/2013 | Goldberg |
| 2013/0257878 A1 | 10/2013 | Jin |

FOREIGN PATENT DOCUMENTS

| | | |
|---|---|---|
| CN | 102880645 A | 1/2013 |
| CN | 102955697 A | 3/2013 |
| JP | 2006236299 A | 9/2006 |
| JP | 2008152739 A | 7/2008 |
| WO | 2003042769 A1 | 5/2003 |
| WO | 2004027706 A1 | 4/2004 |
| WO | 2005114388 A1 | 12/2005 |
| WO | 2006124952 A2 | 11/2006 |
| WO | 2007121050 A1 | 10/2007 |
| WO | 2009146087 A1 | 12/2009 |
| WO | 20130025254 A1 | 2/2013 |

OTHER PUBLICATIONS

Integrated Linked Data Driven Software Development Interaction into an IDE; Aftab Iqbal, Oana Ureche and Michael Hausenblas; DER!, National University of Ireland; Jan. 2009; 13 pgs.

DMAL-BPIDE: A Distributed Multi-Abstraction-Level Business Process IDE; Xiaotian Xu, Hailong Sun, Xu Wang; 2010 International Conference on P2P, Parallel, Grid, Cloud and Internet Computing; 6 pgs.

Components and an Effective IDE of Open Software Platform for Robotics Services; Soohee Han, Mi-sook Kim and Hong Seong Park; International Conference on Control, Automation and Systems 2010; 6 pgs.

Method and Means to Generate Code From Through Visual Editing in a Common Information Model (CIM) Based Programming Environment; Authors et al.: Disclosed Anonymously; IP.com Electronic Publication: Apr. 25, 2013; 6 pgs.

Object Technology Development and Unigraphics; Graeme Britton, Ma Yong Sheng, Tor Shu Beng; Unigraphics User Group 1999 Spring Conference; 4 pgs.

Bridging the Divide Between Software Developers and Operators Using Logs; Weiyi Shang; Software Analysis and Intelligence Lab (Sail); !CSE 2012, 4 pgs.

Search Report and Written Opinion issued in PCT/US14/27854 dated Aug. 18, 2014.

Nakamura, Katsuishi, et al., "On the Framework for Network Measurement as a Service—The perfSONAR-based Integrated network management," 2009 IEICE, 7 pages.

Benoit Encelle, et al., "A transformation framework for building personalized user interfaces for browsing XML content," Semantically Aware Docuemnt Processing and Indexing, ACM, 2 Penn Plaze, Suite 701, New York NY 10121-0701 USA, May 21, 2007 )May 21, 2007, pp. 49-57, XP058212460, DOI: 10.1145/1283880.1283890, ISBN: 978-1-59593-668-4.

Sang Hyuk, Son: "Replicated data management in distributed database systems," SIGMOD Record, ACM, New York, NY, US, vol. 17, No. 4, Nov. 1, 1988 (Nov. 1, 1998), pp. 62-69, XP058090279, ISSN: 0163-5808, DOI: 10.1145/61733.61738.

Extended European Search Report for European Application No. 20163995.2-1213, dated Jun. 24, 2020, 8 pages.

Eessaar et al., A Decision Support Method for Evaluating Database Designs, Department of Informatics, Tallinn University of Technology, Jan. 2012, 26 pages, ComSIS Vo. 9, No. 1.

Priya Gupta et al., "A Trigger-Based Middleware Cashe for ORMs" F. Kon and A.-M. Kermarrec (Eds.) 2011, LNCS 7049, pp. 329-349, 2011, IFIP International Federation for Information Processing 2011.

* cited by examiner

TECHNOLOGIES FOR DATA CAPTURE AND DATA ANALYSIS

CROSS-REFERENCE TO RELATED APPLICATIONS

The instant application is a continuation of prior U.S. patent application Ser. No. 15/677,832, entitled "METHOD AND APPARATUS FOR MODIFYING AN OBJECT SOCIAL NETWORK" and filed Aug. 15, 2017, which prior application is a continuation of prior U.S. patent application Ser. No. 15/095,689 (now U.S. Pat. No. 9,792,347), entitled "Process For Representing Data In A Computer Network To Facilitate Access Thereto" and filed Apr. 11, 2016, which prior application is a continuation of U.S. patent application Ser. No. 14/211,727 (now U.S. Pat. No. 9,430,549), entitled "Knowledge Capture And Discovery System" and filed Mar. 14, 2014, which prior application claims the benefit of Provisional U.S. Patent Application Ser. No. 61/787,177 entitled "Enterprise Level Application Software Development System" and filed Mar. 15, 2013, the teachings of which prior applications are incorporated herein by this reference.

FIELD

The instant disclosure relates generally to enterprise information management and, in particular, to a system for the capture and discovery of knowledge as part of, or supplement to, enterprise information management.

BACKGROUND

Various types of entities, such as businesses or other organizations collectively referred to here as enterprises, are typically created, organized and operated in order to achieve specific goals, e.g., provide goods and/or services to relevant consumers. In order to achieve these goals, many enterprises of varying sizes share the characteristics of engaging in myriad processes and, when executing such processes, acquiring substantial quantities of data related thereto. As enterprises become increasingly large and/or seek to achieve ever more difficult and complex goals, the ability to attain true understanding of the processes involved in order to properly manage such processes, as well as the resources required to implement them, often becomes an intractable problem. While substantial quantities of data may exist that could be used to develop such insight, the sheer quantity, complexity and variability of such data makes it difficult to exploit this potential resource.

Various technologies currently exist to address portions of this problem. For example, in order to efficiently store and provide access to data, numerous database technologies have been developed over the last forty years, each of which may have particular advantages and disadvantages. Additionally, even with such technologies, providing decision makers access to this data requires the support of specifically trained technologists, such as software development and/or database management experts. This results in substantial expense and the very real possibility that needs of the data consumers are not being met. Further still, even though techniques are known for deliver reports from such stored data, the ability to develop insights and understanding about the processes such data represents remains a difficult task.

Thus, it would be advantageous to provide a system that permits enterprises data to be captured and thereafter made available in a way that facilitates access thereto such that even those having little or no experience in enterprise data management may be able to develop insights that were previously prohibitively expense, if not impossible, to achieve.

SUMMARY

The instant disclosure describes a system for knowledge capture and discovery that overcomes the disadvantages of prior art solutions. In particular, a method and apparatus for analyzing data is provided in which data is stored in at least one storage device as a plurality of objects and relationships between the plurality of objects where the relationships between the plurality of objects establish an object social network. Root cause analysis is performed on at least a portion of the object social network to identify a potential causal relationship between a first object of the plurality of objects and a second object of the plurality of objects. Thereafter, the object social network is modified based on the potential causal relationship between the first object and the second object. At least one of the first and second objects may be representative of a plurality of other objects.

BRIEF DESCRIPTION OF THE DRAWINGS

The features described in this disclosure are set forth with particularity in the appended claims. These features will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
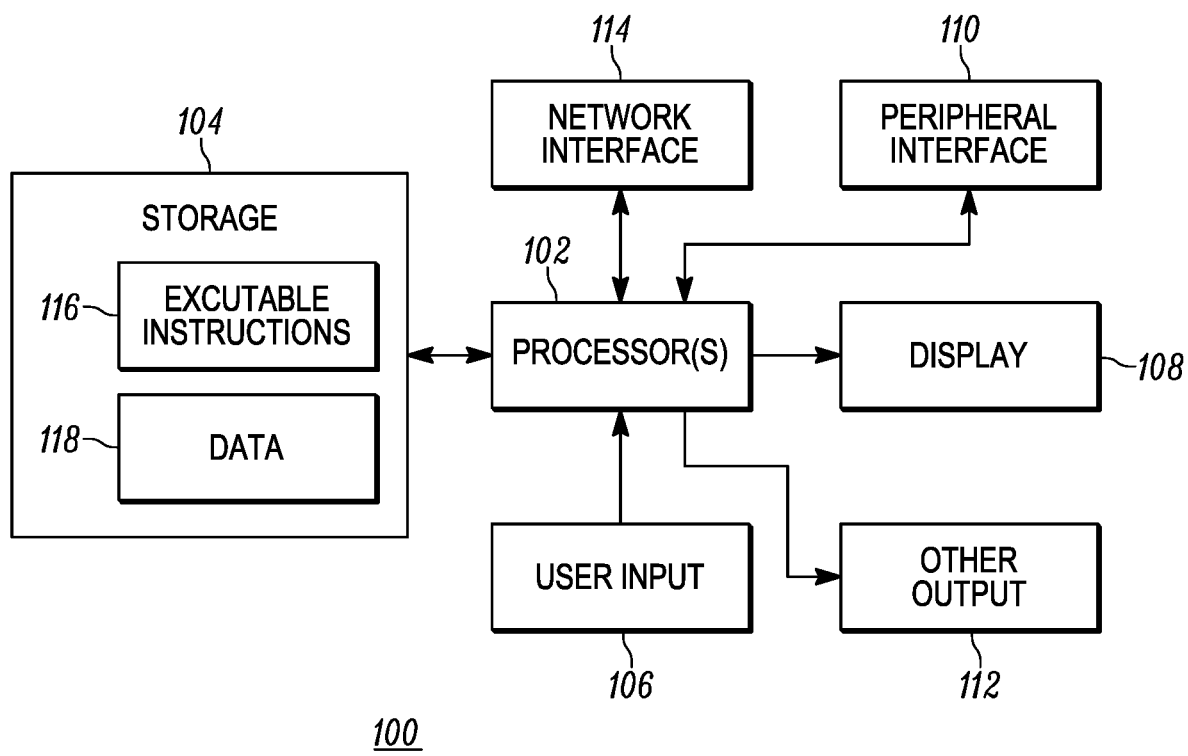
FIG. 1 is a block diagram of an exemplary processing device that may be used to implement various aspects of the instant disclosure.

FIG. 1 illustrates a representative processing device 100 that may be used to implement the teachings of the instant disclosure. The processing device 100 may be used to implement, for example, one or more components of the system 200 described in greater detail below. For example, the processing device 100 may comprise a workstation computer or server computer. Regardless, the device 100 comprises a processor 102 coupled to a storage component 104. The storage component 104, in turn, comprises stored executable instructions 116 and data 118. In an embodiment, the processor 102 may comprise one or more of a microprocessor, micro controller, digital signal processor, coprocessor or the like or combinations thereof capable of executing the stored instructions 116 and operating upon the stored data 118. Likewise, the storage component 104 may comprise one or more devices such as volatile or nonvolatile memory including but not limited to random access memory (RAM), read only memory (ROM) or other non-transitory, machine-readable devices. Further still, the storage component 104 may be embodied in a variety of forms, such as a hard drive, optical disc drive, floppy disc drive, etc. Processor and storage arrangements of the types illustrated in FIG. 1 are well known to those having ordinary skill in the art. In one embodiment, the processing techniques described herein are implemented as a combination of executable instructions and data within the storage component 104 of one or more processing devices 100.

As shown, the device 100 may comprise one or more user input devices 106, a display 108, a peripheral interface 110, other output devices 112 and a network interface 114 in communication with the processor 102. Although the connections between the processor 102 and the various other devices/displays/interfaces 106-114 are illustrated as separate, direct connections, those having ordinary skill in the art will appreciate that, in practice, one or more bus subsystems (not shown) may be used as a mechanism for letting the various components of the processing device 100 communicate with each other as intended. The user input device 106 may comprise any mechanism for providing user input to the processor 102. For example, the user input device 106 may comprise a keyboard, a mouse, a touch screen, microphone and suitable voice recognition application or any other means whereby a user of the device 100 may provide input data to the processor 102. The display 108, may comprise any conventional display mechanism such as a cathode ray tube (CRT), flat panel display, or any other display mechanism known to those having ordinary skill in the art. In an embodiment, the display 108, in conjunction with suitable stored instructions 116 executed by the processor 102, may be used to implement graphical user interfaces as described below. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices or any other input source used in connection with the instant techniques. Likewise, the other output device(s) 112 may optionally comprise similar media drive mechanisms, other processing devices or other output destinations capable of providing information to a user of the device 100, such as speakers, LEDs, printers, fax machines, tactile outputs, etc. Finally, the network interface 114 may comprise hardware, firmware and/or software that allows the processor 102 to communicate with other devices via wired or wireless networks, whether local or wide area, private or public, as known in the art. For example, such networks may include the World Wide Web or Internet, or private enterprise networks, as known in the art.

While the device 100 has been described as one form for implementing the techniques described herein, those having ordinary skill in the art will appreciate that other, functionally equivalent techniques may be employed. For example, as known in the art, some or all of the functionality implemented via executable instructions being executed by one or more processors may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single processing device 100 is illustrated in FIG. 1, it is understood that a combination of such processing devices may be configured to operate in conjunction (for example, using known networking techniques) to implement the teachings of the instant disclosure. Due to the ever-changing nature of processing devices and networks, the description of the processing device 100 depicted in FIG. 1 is intended only as a specific example representative of the wide array of processing devices known to those of ordinary skill in the art.

Figure 2:
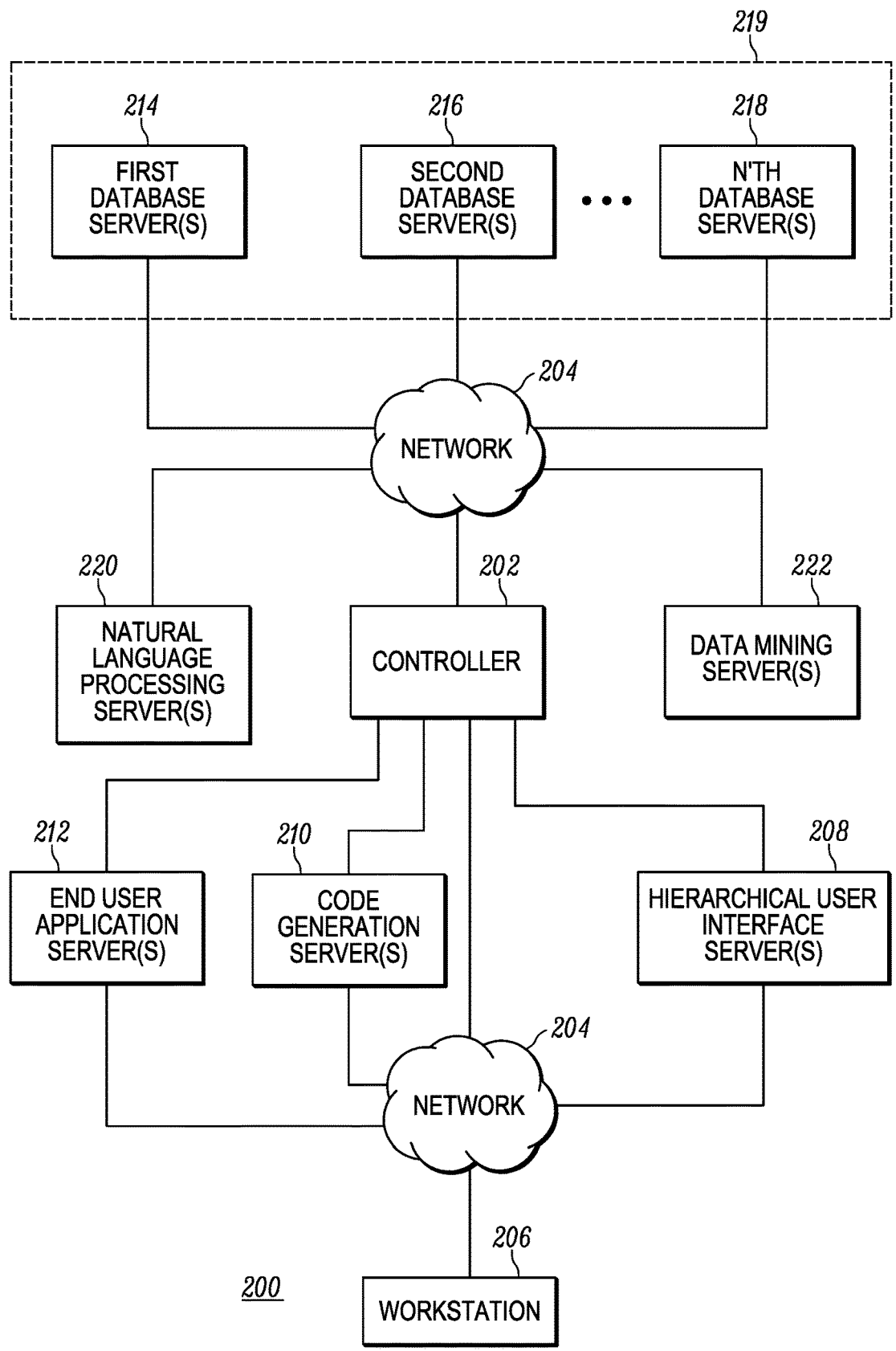
FIG. 2 is a block diagram illustrating various networked hardware components that may be used to implement features of the instant disclosure.

Referring now to FIG. 2, a system 200 is shown illustrating a number of hardware components that may be used to implement the teachings of the instant disclosure. As shown, the system 200 comprises a controller 202, which may comprise one or more server computers. The controller 202 communicates with a variety of other components either directly or via one or more networks 204. The networks 204 may comprise any desirable combination of wired or wireless networks, whether local or wide area, private or public, as known in the art. As noted above, such networks may include the World Wide Web or Internet, or private enterprise networks, as known in the art.

A workstation 206, which may comprise a processing device such as a desktop or laptop computer or mobile computing device, may communicate with the controller 202 via the network 204. In an embodiment, the workstation 206 may implement a web browser application or other application capable of providing a graphical user interface, as known in the art. Using such an application, the workstation 206 may further implement one of several hierarchical user interfaces as described in further detail below. Additionally, the workstation 206 may be operative to receive and execute one or more end user applications developed based on such hierarchical user interfaces.

As further shown, one or more hierarchical user interface servers 208 may communicate with the controller 202 and, via network 204, the workstation 206. As known in the art, the one or more hierarchical user interface servers 208 may comprise a combination of application and web servers, where the web servers service requests from users to perform actions using application resources provided by application servers in communication with the web servers. In particular, the web servers relay such requests to an application server that takes the specified action and returns the result of that action to the web server, which in turn relays the result to the user workstation 206. It is noted that, while such web servers may be considered hardware components, as with any of the servers described herein, such web servers may also be a software module operating on a computer system.

Regardless, in accordance with such techniques, the hierarchical user interface servers 208 may provide at least one major developer interface and/or a minor developer interface as described in further detail below. For example, the hierarchical user interface servers 208 may implement web pages or the like that are displayed on the workstation 206 to implement one or more of the hierarchical user interfaces. These hierarchical interfaces, in turn, may be used in one embodiment to ultimately develop application metafiles. As used herein, an application metafile may comprise information, such as user interface markup or functional markup as known in the art and described below, sufficient to generate executable source code. The end user application server(s) 212 may comprise web and application servers, as described above, the function to provide the end user application, generated by the code generation servers 210, to requesting users.

As further shown in FIG. 2, the controller 202 communicates with a plurality of database servers 214-218, which collectively establish a database complex 219. As used herein, a database may comprise any suitable storage device implement a known database storage format including, but not limited to, the various database storage format noted herein. For example, one or more first database servers 214 may be provided implementing a first storage format or schema, one or more second database servers 216 implementing a second storage format or schema and so up to one or more Nth database servers 218 implementing an Nth storage format or schema. For example, in one embodiment, the first database servers 214 may implement a so-called triplestore database, whereas the second database servers 216 may implement a relational database and the Nth database servers 218 may implement yet another database storage format such as, but not limited to, a columnar database, a graph database, a key-value database, a document database and a file storage database. As will be appreciated by those having ordinary skill in the art, still other database storage formats may be used and the instant disclosure is not limited in this regard.

Configured in this manner, the relative advantages of each database storage format are available and the controller 202, as described in greater detail below, effectively serves as an abstraction layer to shield end users from having to master the complexities of each database storage format. In one embodiment also described below, the controller 202 operates to initiate conversion of data from one storage format to another as needed to improve overall performance. In another embodiment, the presence of multiple database storage formats permits users to specifically define conditions leading to a conversion of data. For example, under the so-called CAP (Consistency, Availability, Partition tolerance) theorem, it is asserted that, with a distributed database, one can have only two out of the three attributes: consistency (all nodes have the latest and the same information), availability (uptime/taking requests) and partition tolerance (handling the disconnect state). Based on this goal, a user can specify requirements for data conversion between the various databases to optimize each of these attributes or any combination thereof.

As further shown, the controller 202 may communicate, via the network 204, with one or more natural language processing (NLP) servers 220 and one or more data mining servers 222. As described in further detail below, the NLP servers 220 operate to facilitate the use of natural language queries not only when accessing data within the database complex 219, but also when developing end user applications. Working in conjunction with the NLP servers 220, the data mining servers 222 implement various data mining tasks, such as root cause analysis, classification, clustering, association rule discovery and/or regression analysis based on the data stored in the database complex 219.

Figure 3:
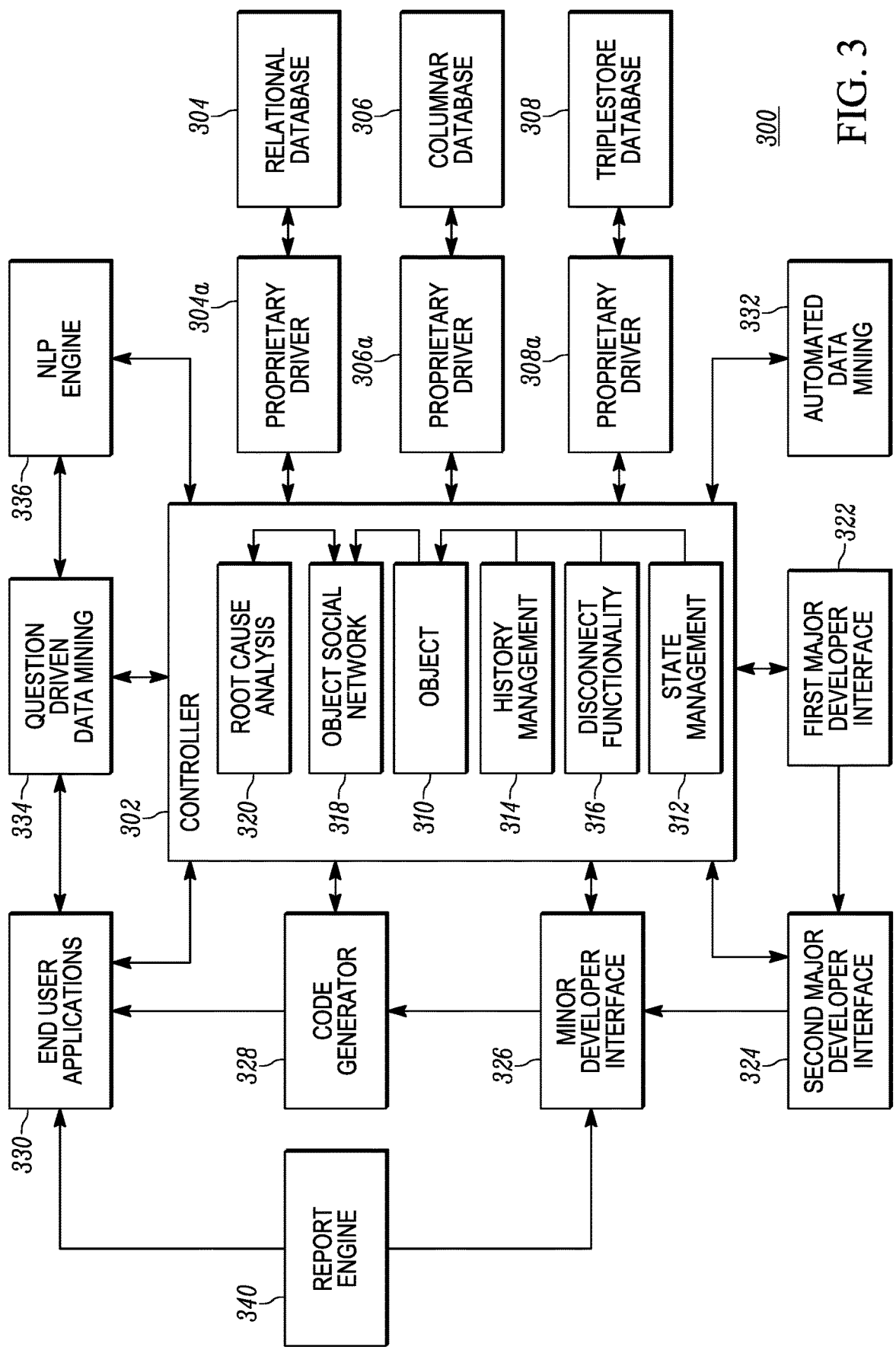
FIG. 3 is a block diagram illustrating functional components in accordance with various embodiments of the instant disclosure.

Referring now to FIG. 3, the system 300 is illustrated according to the various functions provided therein. It is noted that each of the components illustrated in FIG. 3 may be implemented using one or more processing devices, as described above, implementing the functionality described herein. Within the system 300, a controller 302 communicates with a plurality of databases 304-308 that include, in the illustrated example, a relational database 304, a columnar database 306 and a triplestore database 308. As known in the art, each database 304-308 may (and will typically) include its own database management system (DBMS) facilitating interactions with the database. As shown, the controller 302 communicates with the various databases 304-308 through application programming interfaces (APIs) 304a-308a implemented by the corresponding DBMSs.

Such APIs may be embodied by manufacturer-proprietary drivers or a proprietary representational state transfer (REST) interface.

In an embodiment, every piece of data handled by the system 200, 300 is treated as an object. Thus, each piece of data is provided with an object identification which uniquely identifies the object, a state indicator setting forth a current state of an object, a revision number indicating a current state of revision relative to a sequence of revisions for the object and a time stamp indicating when that particular revision was created. An object is never physically deleted in the system. When an object is modified or 'deleted' by the user, the system simply creates revisions of the object to reflect its current state. The old revisions are kept as historical records. An example of an object, in this case a submit button of the type that may be found in a graphical user interface, is shown below in Table 1 using the well-known Java-Script Object Notation (JSON) format in which the object is described according a number of name-value pairs:

TABLE 1

```
{
    "id": "jk234hjk34h2i3o4u89ghkjnhk",
    "objectType": "widget",
    "widgetType": "button",
    "title": "submit",
    "history": {
        "rev": "12",
        "state": "active",
        "timestamp":"1394654029"
    },
    "widgetProperties": {
        "width": "20px",
        "height": "15px",
        "x": "100px",
        "y": "150px",
        "float": "left"
    },
    "behavior": [
        {
            "event": "single click",
            "action": "asdfjk314j2hjwdflj234"
        }
    ]
}
```

In this example, the object is of the "widget" type and, further, a "button" type of widget entitled "submit." This object is currently "active" and is on its twelfth revision. It further includes behavior definition, particularly what "action" to take in the event of a "single click." As known in the art, JSON representations are not only understandable to humans, but may also be parsed by machines. As those having skill in the art will appreciate, a wide variety of object types and sub-types may be used to treat virtually any piece of data as an object. For example, a natural language query provided to the system 200, 300 may be considered as a series of "word" objects, with the query itself treated as an object comprising a collection of such "word" objects. In another example, a segment of software source code may be treated as a first object comprising a number of "statement", "operator", "variable", "variable name" etc. objects.

An advantage of treating all data in the system as objects is that it is compatible with the "triple" data representation concept in which statements can be made about, in the context of the instant disclosure, relationships between objects. For example, the so-called Resource Data Framework (RDF) specifications establishes subject-predicate-object expressions (triples) in order to make statement concerning "resources" (e.g., web resources), though the concept is readily applicable to objects in the sense used herein. As a simple example, building on the example noted above, the fact that a button widget is used in a web form could be described according to the triple illustrated in Table 2 below:

TABLE 2

| x:button | y:is_in | z:form | c:91fbc220-aacd-11e3-a5e2-0800200c9a66 |
|---|---|---|---|

In this example, the subject (button) is related to the object (form) by the relationship predicate "is_in". As known in the art, in RDF, the prefixes x, y and z are typically shorthand representations of Uniform Resource Identifiers (URIs) that provide information uniquely naming entities, in this example, "button", "is_in" and "form." In a presently preferred embodiment, this triple form is extended to the so-called a "nquad" format which provides an additional field (having the prefix, c) for context. Thus, in the example of Table 2, this context field is used to have a universal unique identifier (UUID) value that links object data together. That is, in this embodiment, the context quad field ties various data together in a single object, which, in practice, could contain thousands of triple/quad values. Regardless, as described in greater detail below, conventions like RDF also provide statements that convey ontology information, i.e., information describing the structural framework used to organize information thereby providing a knowledge representation, which ontology information may be used to assist in the conversion of data from one storage format to another.

In an embodiment, all data is added to, changed in, read from or deleted from the databases 304-308 via the controller 302, which, as noted above, terminates all database-specific protocols such that users of the controller 302 are presented with only a single interface. Specifically, the single interface may support common operations expressed in a format that is not dependent upon any one database storage format. For example, the controller 302 may provide a unified API for end users to manage data using a JSON-based, Structured Query Language (SQL)-like API. The SQL-like APIs facilitates communication with both external and internal users of the system 300, particularly in that it bridges the strict and rigid relational database requirements to the relatively loose and flexible NoSQL database requirements, thereby enabling traditional developers to enjoy the benefits of a NoSQL database or multiple databases without going through a steep learning curve. For completeness, it may be desirable in certain instances to provide an end user (in addition to the SQL-like, unified API) access to the DBMS of each database 304-308, although it is anticipated that such access to the underlying database APIs will not be preferred for end users lacking specific knowledge of such APIs. Regardless, in this embodiment, the SQL-like, unified API methods include the create, read, update and delete (CRUD) operations typically provided by all database management systems. JSON examples of such create, read, update and delete operations are illustrated in Tables 3-6 below.

TABLE 3

JSON create

```
{
    "collection":"VideoRental",
    "data":{
        {"name":"Customer", "CustomerFirstName":"Paul",
         "CustomerId": "9001",},
        {"name":"Rented", "RentalDate":"09/28/01"},
        {"name":"Video", "VideoId":"14564"}
    }
}
```

TABLE 4

JSON read

```
{
    "collection":"VideoRental",
    "select": "CustomerFirstName",
    "where":{
        "relation": {"name": "Rented"},
        "object": {"VideoId":"14564"}
    }
}
```

TABLE 5

JSON update

```
{
    "collection":"VideoRental",
    "update": "CustomerFirstName",
    "where":{
        "relation": {"name": "Rented"},
        "object": {"VideoId":"14564"}
    }
    "value":"Jane"
}
```

TABLE 6

JSON delete

```
{
    "collection":"VideoRental",
    "where":{
        "relation": {"name": "Rented"},
        "object": {"VideoId":"14564"}
    }
}
```

Those having skill in the art will appreciate that the illustrations in Tables 3-6 are examples of the SQL-like, unified API and, further, that the same SQL-like, unified API can be implemented in other formats such as XML. Based on such operation requests, the controller 302 converts, in the examples above, the JSON requests into the necessary database-specific query format. For example, building on the illustrated operations above, a user may submit a read request as in Table 4 to the controller 302. In querying the triplestore database 308, the controller 302 will form a SPARQL query of the type illustrated in Table 7 below:

TABLE 7

```
SELECT ?x
FROM VideoRental
WHERE
{ ?x ?y ?z
    WHERE
    {
        ?y name Rented.
        ?z has property ?h
            WHERE
            {
                ?h name VideoId.
                ?h value 14564.
            }
    }
}
```

In this example, the mapping rules are: "collection": "X"=>FROM X; "select":"X"=>SELECT ?x; "relation": {...}=>WHERE {?x ?y ?z WHERE {?y ...}}; etc. Further mappings of this type will be readily derivable by those having ordinary skill in the art.

As data (concerning an object, as described above) is added, the controller 302 first causes the data to be added in the form of triples as described above, i.e., it is initially created in the triplestore database 308 first and queries against such data is at least initially applied to the triplestore database 308. In an embodiment, the triplestore database 308 may adhere to the so-called nquad format in which a fourth element is added to the triple; in this case, the fourth element is an objected identifier as described above.

As users query the data, a query parser or monitory implemented in the controller 302 monitors query and resulting data patterns. Such query parsers are known in the art as provide, for example, in the Applications Manager by Zoho Corporation Pvt. Ltd. (available at: http://www.manageengine.com/products/applications_manager/database-query-monitoring.html). For example, all queries can be monitored for specific key performance indicators including, but not limited to, what objects are being accessed, whether data is being written to or read from, the data size in question, the frequency of queries (as extrapolated from logging data) or what specific types of reports/SELECT statements are being executed (also, as extrapolated from logging data). As a consequence, the query parser is able to match existing query patterns to predefined data transformation triggering rules, examples of which are provided below. These rules are designed such, when a data pattern satisfies a given rule's conditions, the need to transform data from one storage format to another, either partially or in the whole, is detected. That is, predefined transformation rules permit the controller 302 to decide whether certain data can be transformed; if it can be transformed, the controller 302 initiates a transformation process that iterates through the original data (i.e., stored in the first data storage format) and creates new data in the targeted or second data storage format. Simultaneously, the original data remains untouched so that users can still query against the data during the transformation process. Once the data is transformed, the query parser is notified of the transformation process so that the query parser can change the way it parses future queries against this portion of data. For example, in an embodiment, the query parser modifies the way it maps the SQL-like, unified API operations to particular underlying database APIs such that future queries will be correctly handled and correct answers will be returned.

There may be situations in which it is unknown which database storage format would be the best for a given portion of data. In these instances, it may be desirable to transform the object into each of the available database storage formats and performs simulated load testing. Such load testing can mimic real-world user actions based on collected log data. When doing such load testing, performance of the various activities is monitored and a "best" database storage format may be selected according to which of the various database storage formats demonstrates the best performance as assessed by any desirable criteria. If, for example, the results indicate a significant performance improvement, then an additional rule can be created such that it is triggered by data queries involving the data of the relevant type. In an alternative embodiment, known machine learning techniques may be employed to infer such new rules. For example, a machine learning algorithm can use the known rules to train a statistical model that, in turn, can be used to infer new, previously unknown rules. This way, performance testing (which could be a time consuming process) for otherwise unknown data may be avoided, and instead directly transformed based on an immediately inferred rules. Thereafter, if desired and assuming available resources, the inferred rule can be further verified by the more accurate simulated load testing.

As noted above, rules may be employed to determine when the controller 302 should initiate data transformations. In an embodiment, various factors may be considered to establish such rules, which factors may be generally grouped into data factors or characteristics and usage factors or characteristics. Data characteristics concern specific attributes of the underlying data that may affect the determination of optimal database storage format and include, but are not limited to, data size, required data freshness or required data retention. Usage characteristics concern attributes of how data is used and may include, but are not limited to, frequency of data writes, frequency of data updates, frequency of data reads, data read request types and concurrency of users.

With regard to the various data characteristics, data may be a relatively short, simple text value measured in mere bytes, a graphic measured in megabytes, or a video that is gigabytes in size. As known in the art, the size of each graphic may determine which type of database would be best suited for its storage. Another relevant data characteristic is the required "freshness" of the data. For example, as known in the art, each of the databases 304-308 may implement some form of data caching. The temporary caching of report data allows for great data improvement, but it is only a viable option when the data within the report does not change as often as the data is accessed. Yet another relevant data characteristic is required data retention. In this case, data is usually only directly used for a certain time period. For example second-by-second production line data is typically not going to be directly useful weeks or months in the future. As such, it may be desirable to make optimization choices in which data is autoarchived from an expensive but fast database storage mechanism, to a slower, but low cost storage mechanism given the relatively low frequency of use.

With regard to the various usage characteristics, the frequency of data reads, writes and/or updates may be employed. For example, certain data, depending on its type, may be written once a year (such as data involved in the creation of an annual report), or it could be many times a second in the case of a production line. Relatedly, some data is written once and will never change, whereas other data may change frequently. If low frequency data is replicated in multiple areas, an update thereof will take progressively longer to chain along the line. Furthermore, many systems have tradeoffs between data reads versus data writes, i.e., one operation is more resource-consume than the other. Further still, as known in the art, even with a high frequency of data reads, it makes a major difference if a given report is using the same set of index criteria. For example if you looking at a list of high scores for a competitive tournament, then that may be read every second. However, the change from tournament high scores to specific division high scores may never change, or change extremely infrequently. With further regard to reporting scenarios, the concurrency of users may have a significant impact in determining the best storage format. For example, if there is one user running reports, then caching a report so it stays resident in memory will not offer a significant performance improvement. However, if 100 people request the same report every second, caching of the underlying data will lead to a significant performance improvement.

A variety of rules may be developed based on these characteristics. Performance based on data can be improved by converting between databases, or managing data in the same database. For example, if there is a high frequency of write (update) data, it may be advantageous to use a so-called big data wide column database. To this end, queries against column-based data may be monitored. If queries are run repeatedly on non-indexed columns, then secondary indexes may need to be created. Alternatively, if, after a certain period of time, queries no longer use a specific index, that index can be removed.

In another example, if the underlying data model is based on sets of key-value pairs then a document storage engine should be used. Therefore, a rule can be created to look for, for example, data structures that appear to be arrays within arrays. Relatedly, certain binary data such as photos or videos would be best stored in a file-based database system. As with the key-value store usage scenarios, the controller 302 allows for exposing a native binary data interface that is also linked to relational data stored in a separate interface. For example there may be an object type for videos. As in the object example above, each such video has a unique key identifier that links to a binary object file stored in the file-based database, but the other metadata is stored in a relational database.

If data requires high adherence to the so-called ACID (Atomicity, Consistency, Isolation, Durability) properties, then a relational database with constraints would be best suited. However, even in this scenario, certain tradeoffs should be analyzed to determine the best fit. For example, because of the high concurrency and sheer volume of transactions, data from bank automated teller machines (ATMs) are based on a BASE (Basically Available, Soft state, Eventual consistency) model instead of ACID, which may be better implemented using a wide column database.

For data in which the underlying data model describes any type of network, graph, connections between objects, etc., then such data would be best stored in a graph database. In this case, rules could be established to search for query patterns that imply many relationships, e.g. foreign key relationships, which, as known in the art, involve multiple join operations in relational databases that are very costly in time.

In yet another example, if there is a high repetition, for example, of a given report query, then it would be beneficial to use caching (regardless of the underlying database storage format). As known in the art, caching rules determine how often data in the cache changes and cache invalidation can be time based and/or have a invalidation capability when a change occurs to the source data. In this instance, the cached data may be stored as its own separate object. For instance, the cache object's source data may reside in a wide column database storage format, but the actual cached data may be stored, after conversion, in a key-value storage format within cache memory.

As described above, all data is initially stored in the triplestore database 308 and the controller 302 determines when conversion from the triplestore format to another format is required, or vice versa. In an embodiment, the actual process of converting data from a first database storage format to a second database storage format may be included within the functionality of the triplestore database 308 to the extent that all data is stored, at least initially, in the triplestore database format. Thus, format conversions will be required both into the triplestore database storage format from another database storage format and from the triplestore database storage format into another database storage format. Necessarily, the particular technique employed for a given conversion will depend on the nature of a source or first database storage format and a target or second database storage format.

In general, conversions into the triplestore database storage format are based on identifying the most primitive or fundamental data structure in the source database storage format and mapping those data structures to triples. For example, when converting from a key-value storage format to the triplestore storage format, a conversion process (such as an RDF reasoned, as described in a further example below) can iterate through each key-value and make a corresponding triple. When converting from a wide column storage format to the triplestore storage format, the conversion process may iterate through each keyspace, column family, column and row forming triples along the way. When converting from a document storage format to the triplestore storage format, the conversion process may iterate through each collection, document and key-value forming triples along the way. When converting from a graph database storage format, the conversion process may iterate through all nodes in the data by following connections therebetween and forming triples along the way. When converting from a relational database storage format, the conversion process initially iterates through each table and, for each table, establishes a triple in which the predicate is fixed to "is a table of" Also, any foreign key relationships or other indexes or properties are identified in each table and included in the form of triples, e.g., "x:table1.column1 y:is_foreign_key_to_z:table2.column2." Within each table, the conversion process also iterates through each column. Each column is first defined in a triple format based on the fixed triple predicate of "is a column of" with the triple subject being the column name and the triple object being the actual data value contained within the given cell. Likewise, the conversion process iterates through each row with each cell within the row becoming its own triple.

In a similar fashion, conversions from the triplestore database storage format to another database storage format are fundamentally based on the triples. Where, as noted above, the triplestore database storage format is in nquad form and therefore includes a fourth element comprising an object identification, the object identification is used to establish the context of the triples data to be converted. Thus, when converting from the triplestore storage format to a key value storage format, each triple is converted to a key-value. When converting from the triplestore storage format to a wide column storage format, the conversion process first identifies all distinct predicates in the triples data and creates a column family for each. Thereafter, the conversion process iterates through each triple and forms a row for each. Based on prior query information (as provided, for example, by the query parser in the controller 302), an index scheme for the data being converted may be derived based on prior usage thereof. Techniques for deriving such index schemes are known in the art as taught, for example, in "Oracle Database Performance Tuning Guide (11g Release 1(11.1): Automatic SQL Tuning" (available at: http://docs.oracle.com/cd/B28359_01/server.111/b28274/sql_tune.htm#PFGRF028). Thereafter, secondary indexes, as needed, can be created based on the derived index scheme. When converting from the triplestore storage format to a document storage format, all triples in the triple data being converted is first analyzed to identify predicates ("is_contained_in", for example) that correspond to documents. Thereafter, the conversion process iterates through each triple and creates key-value entries based on each triple, which key-value entries are then linked into a corresponding document. When converting from the triplestore storage format to a graph storage format, the conversion process can iterate through the triples and build out vertices and edges.

Apart from the controller-initiated conversion described above, it is recognized that a substantial amount of data is stored in already-existing RDF databases. In order to use these existing databases, capabilities are provided in the triplestore database 308 to convert such pre-existing RDF data into relational data. For purposes of this description, it is assumed that the triples data adheres to the RDF format, though other triples formats may be used as well. In particular, a conversion of external RDF data starts with the creation of a table that has two default columns: an identification column, serving as a primary key for the table, comprising serial integers starting from 1; and a resourceName column that includes strings designating the names of resources (as that term is generally used in RDF parlance). From this basic table, almost all properties (predicates) within the triples data are identified and converted into columns within the table. Not all RDF properties are used in that manner because some properties (referred to herein as meta-properties) provide information about the underlying ontological structure of the data, rather than the semantic data itself, which ontological information may be used to further develop the relational database representation of the triples data being converted. The use of RDF properties to expand a table may be further explained through use of a simple example.

Table 7 below sets forth a number of RDF statements:

TABLE 7

<lord of the rings> <subject > <middle earth story>.
<lord of the rings> <author> <J. R. R. Tolkien>.
<lord of the rings> <pages> <4709>.
<a song of ice and fire> <subject><seyen kingdoms>.
<a song of ice and fire> <author><George R.R. Martin>.
<a song of ice and fire> <pages><4674>.

Following the conversion principle noted above concerning the use of properties to identify additional table columns, the RDF statements in Table 7 can be converted to the relational representation shown in Table 8 below.

TABLE 8

| id | resourceName | subject | author | pages |
|---|---|---|---|---|
| 1 | lord of the rings | middle earth story | J. R. R. Tolkien | 4709 |
| 2 | a song of ice and fire | seven kingdoms | George R. R. Martin | 4674 |

As this example demonstrates, the conversion of RDF to relational data is the conversion of data structure, or metadata, not the data itself. To further develop the conversion process, it would be advantageous to exploit the meta-properties found in RDF meta-properties.

RDF and relational storage formats share a similar view of data in that they each rely on a class and instance view. On one hand, in RDF, classes and instances are clearly defined and supported by reserved meta-properties such as rdf:class, rdf: type, rdfs:domain, rdfs:range, etc. On the other hand, in relational formats, although the class/instance view is not explicitly defined, it is effectively implemented in another form called "tables and tuples." A table can be viewed as a class, while the columns can be viewed as class properties and the tuples (rows/records) as the instances. Thus, in an embodiment, the approach to converting RDF formatted data to relational formatted data relies on converting RDF classes into relational tables and RDF instances into relational tuples. To this end, it becomes necessary to determine the class of each resource in the RDF, which task may be facilitated through the use of the available meta-properties in the RDF.

Thus, when presented with external RDF data, the conversion process (an example of which is described in further detail below relative to FIG. 4) attempts to classify resources therein by first scanning the resources to identify occurrences of meta-properties indicating such classifications. These known meta-properties are discussed individually below.

A first RDF meta-property is rdf:type, which is formally defined as:

"rdf:type is an instance of rdf:Property that is used to state that a resource is an instance of a class.
A triple of the form:
Rrdf:type C
states that C is an instance of rdfs:Class and R is an instance of C."

Thus, once a conversion process finds this meta-property for a given resource, then it knows explicitly the class of that resource.+

A second RDF meta-property is rdfs:domain, which is formally defined as:

"rdfs:domain is an instance of rdf:Property that is used to state that any resource that has a given property is an instance of one or more classes.
A triple of the form:
P rdfs:domain C
states that P is an instance of the class rdf:Property, that C is an instance of the class rdfs: Class and that the resources denoted by the subjects of triples whose predicate is P are instances of the class C.
Where a property P has more than one rdfs:domain property, then the resources denoted by subjects of triples with predicate P are instances of all the classes stated by the rdfs:domain properties."

Stated another way, this meta-property tells you that the subject of an rdfs:domain triple is a property of the object, and that the subject of any other triple that has that has that property as its predicate necessarily belongs to that class. Thus, consider the RDF statements set forth in Table 9 below.

TABLE 9

<author> <rdfs:domain> <book>.
<lord of the rings> <author> <J.R.R.Tolkien>.

From these statements, one knows that "author" is a property of the class "books." When the "author" property is used as the predicate for the subject of "lord of the rings," one can infer that "lord of the rings" belongs to the class of "books." As known in the art, such inferences may be identified using a RDFS (RDF Schema) inference engine.

A third RDF meta-property is rdfs:range, which is substantially similar to rdfs:domain, except that the resulting inference applies to an object in a triple statement, not the subject. Thus, consider the RDF statements set forth in Table 10 below.

TABLE 10

<eat> <rdfs:range> <food>.
<human> <eat> <vegetables>.

From these statements, one knows that "eat" is a property of the class "food." When the "eat" property is used as the predicate for the object of "vegetables," one can infer that "vegetables" belongs to the class of "food." Once again, as known in the art, such inferences may be identified using a RDFS inference engine.

A fourth RDF meta-property is rdfs:subClassOf. Thus, if one encounters a statement of the form <A><rdfs:subClassOf><B>, then one knows that "A" is a class and that "A" shares all of the properties of the class "B."

Additionally, it should be noted that existing knowledge concerning properties of classes may be exploited as well. That is, if a given resource does not have any ontology information to tell its class (which is quite common), then the conversion process may identify any available properties and compare those properties with an existing class/table and try to match them if possible.

Figure 4:
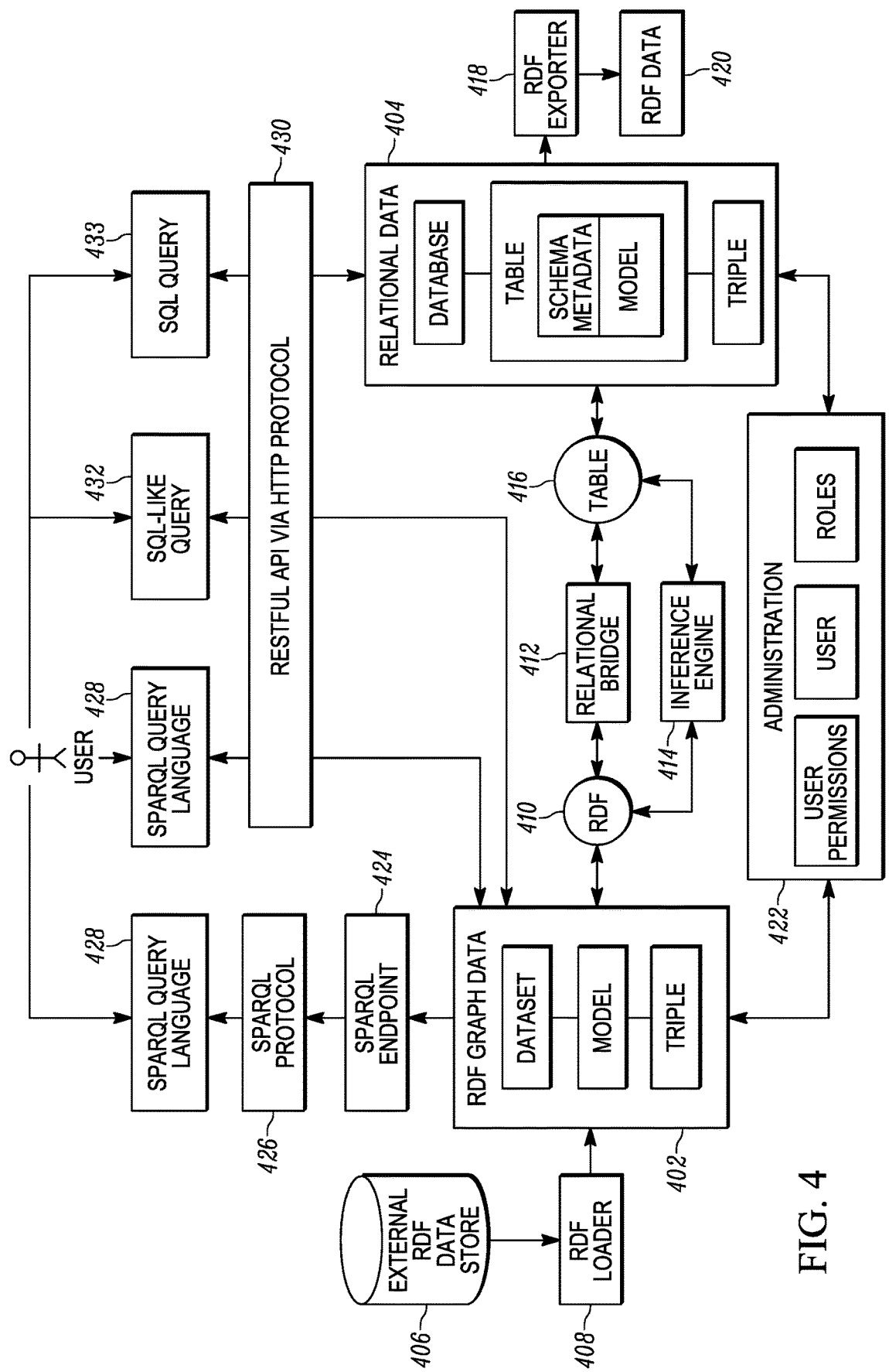
FIG. 4 is a block diagram of an exemplary implementation of data conversion processing based on RDF and relational data.

An example illustrating the conversion process relying on the above-described meta-properties is further illustrated with respect to FIG. 4. In particular, FIG. 4 illustrates components of the triplestore database 308 and the relational database 304, particularly those components involved in data conversion, in greater detail. As shown, RDF data is maintained by an RDF DBMS 402 and, likewise, relational data is maintained by a relational DBMS 404. In an embodiment, RDF data from an external RDF datastore 406 may be imported into the RDF DBMS 404 via an RDF loader 408, as known in the art. To accomplish conversion of the external RDF data to relational data, the triplestore database 308 may include a conversion bridge 412 and inference engine 414. Collectively, the conversion bridge 412 and inference engine 414 constitute an RDFS converter that performs the actual conversion of RDF data 410 into relational data 416. That is, as described in greater detail below, the conversion bridge 412 inspects the RDF data 410 to identify meta-properties therein and, with the assistance of the inference engine 414 as needed, determines properties that may be used to expand the relational data 416 constructed according to the relational database storage format.

In particular, the conversion bridge 412 iterates through the triples in the RDF data 410 searching for meta-properties relating to both the subjects and objects of each triple. Thus, for each statement in which the meta-property rdf:type is found, the conversion bridge 412 first extracts the object that identifies the class of a resource. Thereafter, the conversion bridge 412 conducts a search of all tables to identify a table having the same table name as the extracted class name. If such a table is found, then the conversion bridge 412 compares the properties of the new resource with the existing table's properties (i.e., column definitions). If they do not match, then the conversion bridge 412 adds the properties of the new resource to the table column definition, i.e., it expands the table column definition to include the new resource's properties. If no such table is found, the conversion bridge 412 searches for rdfs:domain and rdfs:range meta-properties related to the resource's class in the RDF data trying to determine the class's attributes. Additionally, the conversion bridge 412 searches for properties of the object of the class. If, after these further efforts, no such properties or attributes are found, then a new table is created, taking its table name from the new resource's name, followed by the string "_UNKNOWN_CLASS."

If the meta-property rdfs:subClassOf is found, the conversion bridge 412 knows that this resource is a class, and thus it should be represented as a table. For both this current class and its parent class, the conversion bridge 412 searches to determine if either class has as yet any properties associated therewith. If a resource with rdf: type and either of the classes as an object is found, then all properties associated with that resource are extracted as properties of the other class. If a property is found with the meta-properties rdfs: domain or rdfs:range as the property and either one of the classes as the object, then that property is extracted, using the inference engine 414, as a property of the corresponding class. If either one of the current or parent classes is found with the rdfs:subClassOf property, then these steps are repeated on the basis of those sub/parent classes. Additionally, for the current class, the conversion bridge 412 searches all tables to identify a table having the same table name as the current class' name. If such a table is found, then the conversion bridge 412 compares the properties of the new resource with the existing table's properties (i.e., column definitions). If they do not match, then the conversion bridge 412 adds the properties of the new resource to the table's column definitions. However, if no such table is found, then a new table is created based on the current class name and the properties previously collected for that current class are used as column definitions. If more rdfs:subClassOf statements are found, then the previous steps are repeated on the basis of the new current class and parent class.

As it iterates through the RDF data 410, the conversion bridge 412 may determine that a given resource has no ontology information (as provided by the above-described meta-properties) associated therewith. In this instance, the conversion bridge 412 will attempt to classify the resource based on comparison of any known properties for the resource. In particular, the conversion bridge 412 may be provided with a confidence level, c (where 0<=c <=1). For example, the confidence level may be provided by a user of a workstation 206, an administrator or the like. Regardless of the source of the confidence level, the conversion bridge 412 searches through all available tables that a current user has access to and, for each table, counts the number of columns and compares that column count value with the unclassified resource's number of properties, i.e., a property count value. Treating the greater of the column count value and the property count value as n and the smaller as m, the number of common properties between the two, p, are counted. If p>=m*c, indicating that the similarities between that table's columns and the resource's properties are sufficiently high, then the conversion bridge 412 temporarily records that table's name in a list. After all of the tables have been processed in this manner, the list is searched and, if the list is empty (indicating that no sufficiently similar table was identified), then the unclassified resource cannot be classified by any known information. In this case, the conversion bridge 412 treats the unclassified resource as a new class and creates a new table after the name of the unknown resource followed by the string "_UNKNOWN_CLASS" and inserts the resource into the new table. On the other hand, if the list is not empty, then the table with the maximum p is identified. The conversion bridge 412 then assumes that the identified table is the class of the resource and compares the properties, as described above, and expands the table column definition if necessary. Thereafter, the resource is inserted into that table. In this manner, the worst case scenario occurs when the RDF data 410 contains no ontology information (meta-properties) and all resources share completely different properties. In this worst case scenario, then, the conversion bridge 412 would generate a potentially large number of tables with only one record in each table. To avoid that problem, the confidence level could be set to 0 so that all unclassified resources are treated as of the same class, and thus be inserted in the same table, which likewise may not be a desirable results. Thus, the confidence level balance the number of tables created versus the precision of classifications.

Once the conversion of the RDF data 410 to the relational data 416 has completed, the RDF data 416 may be added to the relational DBMS 404. In a similar vein as the RDF loader 408, the relational DBMS 404 may be in communication with an RDF exporter 418 that, as known in the art, is capable of exporting relational data directly into RDF data 420 (e.g., as described above).

FIG. 4 illustrates additional components that may be used in conjunction with the RDF DBMS 402 and relational DBMS 404. For example, an administration component 422 may be provided, as known in the art, to manage, as illustrated, the specific rights each user has (User Permissions), identifications of valid users (User) and identification of specific user roles (Roles). As further shown, a number of query interfaces may be provided to offer various ways for users to access the RDF and relational data. For example, a SPARQL endpoint 424, as known in the art, supports the so-called SPARQL RDF query protocol 426. In this manner, a user may directly access the RDF DBMS 404 using SPARQL queries 428. Alternatively, the unified API 430 noted above may be used to not only support SPARQL queries 428 and SQL-like queries 432 for accessing the RDF DBMS 402, but to also support the use of SQL queries 433 for accessing the relational DBMS 402.

Referring once again to FIG. 3, an object 310 of the type described above is centrally illustrated within the controller 302 to emphasize the object-centric approach employed by the controller 302. Furthermore, the controller provides a number of functions stemming from the use of objects. As illustrated in Table 1, objects include one or more state indicator that may take on a number of values to reflect different states, depending on the nature of the object. A state management component 312 tracks such state information for every object in the system 300. For example, as described in greater detail below, individual objects can have a wide variety of relationships with each other, which relationships may be reflected in the state indicator(s). For example, an object representative of specific data may include an indicator whether the object drives another data object (e.g., as in the case where a "unit price" data object would drive a "total purchase price" data object), or is driven by another data object (e.g., same example, but from the point of view of the "total purchase price" data object). Alternatively, widgets, as used herein, refer to objects that themselves may be a collection of other objects (or widgets) having various relationships to each other. These relationships between constituent objects (and/or other widgets) may be reflected in a number of state values such as, but not limited to, "contains," "has child," "has parent," etc. Furthermore, state data may reflect temporal usage states of objects, e.g., "can be used," "is used" or "has been used" state values. Further still, state indicators may be binary in nature, as in the case of "hidden" versus "visible" state values or "enabled" versus "disabled" state values. Again, the examples above are just illustrations of the myriad possible state indicators and values that may be employed.

A history management component 314 is operative to maintain information concerning revisions to each object and tracking which revisions is the most current. Similar to the state indicators described above, revision states may include, as known in the art, "current," archived," "deleted" or "historic," all of which are tracked for each object (within the databases 304-308) by the history management component 314

A disconnect component 316 is provided to manage conflict situations that may arise with certain objects in the event that connectivity with the controller 302 is lost. As described in greater detail below, objects tracked by the controller 302, particularly those relating to software widgets or other discrete functional components, may be used to construct end user applications. To this end, as the application is built based on certain objects, the author of the application is queried to designate certain objects to be available even in the event of a disconnect, and this information is tracked by the disconnect component 316. The application is then made available to end users via an end user application server. When an end user accesses the application on the end user application server, the server negotiates with the client processing device (e.g., desktop computer, laptop computer, mobile wireless device, etc.) to determine how much local storage is available to be allocated to disconnect functionality, where the desired amount of local storage is dependent in part upon the particular objects required to be available despite disconnection. This process of negotiating with client processing devices may be repeated for a number of other end user processing devices using the same application such that each client processing device includes the same local storage for the designated objects. When a disconnect occurs relative to one of the end user's client processing device, the controller 302 detects this condition using known techniques, and the other end user client devices are notified of this fact by the disconnect component 316. Additionally, the disconnected end user client device switches to a mode in which it uses its local storage to maintain operation of the designated objects. For example, if a designate object is a widget that tracks the placement of purchase orders, any use of that widget, e.g., "Send a P.O. from Company A to Company B for 1,000 parts" is maintained (in the sense of continuing to be able to create, read, update and delete data) in the local storage only. Meantime, the other end user client devices can continue to operate normally, including using the same designated object in a manner that might conflict with the disconnected client device, e.g., "Send a P.O. from Company A to Company B for 2,000 parts." However, as it does so, the disconnect component 316 tracks usage of the designated component by the other end user clients. When the disconnected client device resumes connectivity with the controller 302, the data stored in its local storage is uploaded to the controller 302 and the disconnect component 316 can detect the occurrence of the conflict. In effect, the disconnect components 316 "quarantines" any data relating to any designated components used by the disconnected end user client during the period of its disconnection. Upon detecting a conflict, the disconnection component 316 can resolve the conflict in different ways. Thus, in an embodiment, the disconnection component 316 may have rules regarding hierarchy of the various end user client devices. For example, within an enterprise or similarly hierarchically organized entity, specific end user clients can be associated with the titles, positions or other precedence indicators to determine which end user client should take precedence over the other and therefore automatically resolve the conflict in accordance with the data provided by the end user client having the higher precedence. In those instances where such automatic resolution is not possible, the controller 302 can send the conflicting data to the conflicting end user client devices with a request to resolve the conflict. Thereafter, presuming the conflicting clients are able to resolve the conflict, data can be provided back to the disconnect component 316 indicating how the conflict can be resolved, i.e., which data to store.

Based on the state information maintained by the state management component 312, a "social" network for each object can be constructed. That is, using the relationship information maintained for each object, it is possible to create a network representation of objects and their relationships to each other. For example, an "employee first name" object and an "employee last name" object may each reflect a "belongs to" state relative to an "employee name" object that, in turn, may have its own connections to other objects, and so forth. Such networks may be derived by a network component 318 using known network discovery techniques. For example, using known data mining techniques (e.g., root cause analysis, classification, clustering, association rule discovery and/or regression analysis) as provided, for example, by the data mining servers 222 (used to implement the automated data mining component 332 described below).

Furthermore, a root cause analysis component 320 (not to be confused with the root cause analysis used by the network component 318 to produce the object social networks) may be provided, as shown. Once again using known techniques such as neural network analysis or regression analysis, so-called root causes within object social networks (as provided by the network component 318) can be identified relative to certain objects. To be more precise, the root causes is such social networks cannot always be directly identified and, instead, correlational relationships are sometimes identified that are potential causal relationships. That is, for relatively simple and clear social networks, root causes can be identified with certainty. However, complex and/or vague social networks, correlational relationships can be identified subject to additional human analysis. For example, a number of objects relating to an object "employee efficiency" may include "employee age," "employee skill level," "day of the week," "factory temperature," etc. In the case of neural network analysis, the data underlying these objects may be analyzed using known techniques to reveal a network function that effectively reveals the most significant factor in predicting the values of the "employee efficiency" object. The identification of such root causes may then be used to create associations between objects that previously did not exist, or to update or even delete previously defined associations.

As alluded to above, applications for use in conjunction with the data stored in the system 200, 300 may be developed using a plurality of hierarchical user interfaces. In the illustrated example, the hierarchical user interfaces include a first major developer interface 322, a second major developer interface 324 and a minor developer interface 326. It is noted that all of the developer interfaces 322-326 are optional and any combination of them may be provided. Generally, each of the developer interfaces 322-326 has two usage patterns or roles: as an independent platform that can be used separately by different users for different purposes, or as a related platform that collaborates with the other platform(s), if provided, to work as one unified system. In an embodiment, the first major developer interface 322, the second major developer interface 324 and the minor developer interface 326 function as successively higher abstraction layers in software development; the higher the abstraction level, the easier it is to use since for application development as progressively more programming details are hidden.

Thus, in an embodiment, the first major developer interface 322 is an integrated development environment (IDE), such as Apache Eclipse as known in the art. Using the first major developer interface 322, relatively skilled programmers can use it to develop any type of software. The second major developer interface 324 can be implemented using any of a number GUI application builders, including the same application used to implement the major developer interface 322, which can be used to construct fully functional GUI applications at an intermediate level of abstraction. The minor developer interface 326 may comprise any of a number of graphical, web application builders such as Zoho Creator that may be used, as known in the art, to allow individuals having virtually no software development skills to construct applications based on high level functional building blocks. Thus, the low level of abstraction provided by the first major developer interface 322 is evident in that users thereof are dealing with specific programming language features, whereas functions used in the second major developer interface 324 are programming language-independent and, within the minor developer interface 326, there are no programming-specific terminologies or features at all.

In operation, as known in the art, the first major developer interface 322 provides a number of modes permitting a user thereof to generate and modify software code. For example, some IDEs are equipped with defined, selectable tasks. Upon selection of a given task, a code template may also be selected such that the IDE automatically generates code based on the selected template. Alternatively, a user can define an operation through a series of dropdown menus, which menus are continuously updated to show available operations. As the user selects various operations, code is automatically generated. In yet another embodiment, a natural language processing engine may be used to parse natural language text provided by the user to provide intermediate command statements that may then be analyzed to provide automatically generated code. In all instances, the automatically generated code may be modified by the user as desired to provide the final desired code.

The second major developer interface 324, as known in the art, provides a "drag and drop" graphical user interface in which various user interface controls are provided in a toolbox. The various available controls may be dragged to a design area to create an instance of the selected control, which instance may be subsequently selected and configured to exhibit certain behaviors. Similarly, any desired event definitions, flow control or actions may be added to a selected control instance. By combining such controls together, a widget or more complete application may be produced implementing a desired user interface functionality. Once fully configured, the resulting widget or application may be published.

It is noted that any code and/or widgets produced by the first and second major developer tools 322, 324 may be stored as objects by the controller 302.

Similar to the second major developer interface 324, the minor developer interface 326 is also based on a "drag and drop" GUI. However, the provided tool box for the minor developer interface 326 may include published widgets or applications that may be selected and combined in a design area. Once a complete application is defined, the second major developer interface 326, using known techniques, generates an application metafile that describes the operation of individual widgets and their respective relationships to each other using, for example, an user interface markup language (such as Qt Meta Language (QML)) and/or a functional markup language (such as Behavior Markup Language (BML)). The resulting application metafile is then passed to a code generator 328 which generates source and executable code. An example of such a code generator is the Acceleo open-source code generator available from the Eclipse Foundation. The resulting source code and executable code may be stored as objects by the controller 302, and the executable code 330 may be made available to end users via a suitable application server or the like.

As noted above, each of the interfaces 322-326 may be used in a collaborative fashion as well. For example, the first major developer interface 322 can be used to focus on a developing constructs using a particular programming language with which it is compatible, i.e., building programming language entity and logic wrappers for use by the second major developer tool 324. For example, using the first major developer interface 322, a developer can wrap a Java GUI component, say a text input box, into a specific object and make that object available (through the controller 302) to the second major developer interface 324, thereby permitting the second major developer interface 324 to add this object into a toolbox for subsequent use. In this manner, the first major develop interface 322 can be viewed as a "plugin" for the second major developer interface 324, thereby extending the second major developer interface's functions.

In turn, the second major developer interface 324 can be used collaboratively in terms of focusing on a type of application it can develop, i.e., building GUI components and logic wrappers for use by the minor developer interface 326. For example, using the second major developer interface 324, a developer can wrap a "Submit" button to include logic enabling a single click on the button to cause all data on a current screen to be gathered and submitted to the databases 304-306, and feed this object to the minor developer interface 326, thereby permitting the minor developer interface 326 to add this object to its toolbox for subsequent use. Once again, in this manner, the second major develop interface 324 can be viewed as a "plugin" for the minor developer interface 326, thereby extending the minor developer interface's functions.

Referring once again to FIG. 3, the system 300 comprises various functions that enhance users' ability to interact with the stored data. In one embodiment, an automated data mining component 332 implements a variety of known data mining algorithms that may be applied against the data stored in the databases 304-306 (as mediated by the controller 302). In a particular embodiment, the automated data mining component 332 operates to best pre-process data for a given data mining task, and to select the best data mining algorithms for the data mining task.

As known in the art, data mining produces the best results when pre-processing is performed on the data to be analyzed. However, such pre-processing may be strongly dependent upon the nature of the data to be analyzed. The automated data mining component 332 can engage in training in order to automatically select the best data pre-processing. To this end, a sample dataset is first gathered and the statistical characteristics thereof are extracted. Such statistical characteristics may include, for example, mathematical features such as mean, mode, median, range and standard deviation, etc. They may also include simple facts such as the number of attributes, the type of each attributes (e.g., nominal versus numerical), dataset size, etc. Having thus characterized the dataset, a number, N, of known data pre-processing algorithms may be run against the dataset such that the resulting pre-processed data for each pre-processing algorithm is separately stored. Thereafter, a number, M, of known data mining algorithms may be run on each pre-processed data set thereby producing N×M data mining result sets. Each of the data mining result sets is then evaluated, using known techniques, to assess the resulting precision and accuracy of the relevant pre-processing and data mining algorithm combinations. Where possible, parameters for each data pre-processing algorithm may also be varied to identify the best combination of pre-processing algorithm and parameters, as well data mining algorithm. Once identified, the best combination of pre-processing algorithm/parameters/data mining algorithm may be designated as a class attribute and the statistical characteristics of the dataset may be designated as an input attribute. These class/input attributes are then used to increment a pre-processing selection learning model such that subsequent datasets having substantially matching statistical characteristics can be pre-processed in the same manner.

Additionally, it may be the case that certain data mining algorithms are better than others for a given data mining task. In a manner similar to the described above for training to select the best pre-processing algorithms, the automated data mining component 332 can also engage in training in order to automatically select the best data mining technique based on the specific data mining task to be performed. To this end, a sample dataset is once again gathered and the statistical characteristics thereof are extracted. Having thus characterized the dataset, a number, N, of known data pre-processing algorithms may be run against the dataset such that the resulting data sets for each data mining algorithm is separately stored. Each of the data mining result sets is then evaluated, using known techniques, to assess the resulting precision and accuracy of each data mining algorithm. Where possible, parameters for each data mining algorithm may also be varied to identify the best combination of data mining algorithm and parameters. Once identified, the best combination of data mining algorithm and parameters may be designated as a class attribute and the statistical characteristics of the dataset may be designated as an input attribute. These class/input attributes are then used to increment a data mining selection learning model such that subsequent datasets used to be subjected to the given data mining task and having substantially matching statistical characteristics can be processed in the same manner.

In an embodiment, the benefits of the best pre-processing and/or data mining algorithms may be obtained by a further process. In this process, a dataset to be pre-processed or subjected to a given data mining task may once again be characterized statistically, as described above. Based on the resulting statistical characteristics, the best k pre-processing or data mining algorithms are selected based on the degree of similarity between the statistical characteristics of the data set and input attributes, as described above. In parallel, the input dataset may be subjected to data reduction, as known in the art, such that all available pre-processing or data mining algorithms can be applied against the reduced input dataset, and the best n pre-processing or data mining algorithms selected. In yet another parallel path, a machine learning model may be employed to determine the best m pre-processing or data mining algorithms. Thereafter, the results of the k, m and n different pre-processing or data mining algorithms are compared to select the best h pre-processing or data mining algorithms. These h pre-processing or data mining algorithms are then run against the input data set and the results are then averaged together. The resulting average output should then represent the best possible combination of pre-processing or data mining algorithms.

In another data mining embodiment, a question-driven data mining component 334, optionally operating in conjunction with a natural language processing engine 336, is provided. The question-driven data mining component 334 provides a mechanism for users with little or no data mining experience to performing data mining tasks. End users may provide data mining requests to the controller 302 which may then submit the requests either directly to the question-driven data mining component 334 or, where the request is expressed in natural language text, through the NLP engine 336 for conversion into instructions that may be used by the question-driven data mining component 334 to analyze the necessary datasets.

In particular, the question-driven data mining component 334 receives users' questions expressed in natural language via, for example, an user interface for that specific purpose. As these complex questions (e.g., questions expressed in "why" or "how" form) are received, the question-driven data mining component 334 invokes processing by the NLP engine component 336 (as described below). In the event that the NLP engine component 336 cannot handle the complex formation of the question, it will parse the question into a data mining task that can be implemented by the automated data mining component 332. The NLP engine component 336 informs the question-driven data mining component 334 of the need for the data mining operations, which causes the question-driven data mining component 334 to generate parameters required to initiate the data mining tasks (for example, in the form of requests expressed according to the API protocol described below and set forth in the accompanying Appendix). These parameters are then used to initial the data mining tasks as performed by the automated data mining component 332, with the results being returned to the question-driven data mining component 334. In order to provide the results to the user, then question-driven data mining component 334 then passes the results to the NLP engine component 336.

In an embodiment, as noted above, in order to provide the available data mining operations, the automated data mining component 332 may expose API methods to receive external requests in the format of HTTP (Hypertext Transfer Protocol) POST requests that ask for executions of specific types of data mining operations. In response to a request, the API can return an estimated time to finish the requested operation in the format of another HTTP POST. As known in the art, and as noted hereinabove, any of a variety of different types of data mining tasks may be provided, including but not limited to root cause analysis, classification, clustering, association rule discovery, regression analysis, etc.

Summarized, processing by the API may be described as follows:
1. The API method receives an HTTP POST request.
2. The API method extracts the request data and parses the data.
3. The API method verifies the request data. If the request is valid, then processing continues at step 5.
4. If the request is invalid, then the API method returns an HTTP POST response containing error information and processing terminates.
5. When the request is valid, the API method calls a time estimation module that calculates an estimate of the time required to execute the request based on the selected data.
6. The API method returns an HTTP POST response containing the estimated time.
7. Based on information in the request, the API method identifies the implicated objects via the controller thereby identifying the required data, automatically applying data preprocessing steps and selecting the best algorithms (as described above), and runs the data mining processes.
8. When the processes are completed, the API method returns the results to the requester.

In a presently preferred embodiment, messages sent via the HTTP-based interface use JSON standard format. Further details regarding the API methods are provided hereafter in the Appendix.

As summarized above, the API exposed by the automated data mining component 332 verifies each POST request against the required headers and the JSON schema defined in the Appendix, with any resulting error messages being returned in POST responses. In an embodiment, the automated data mining component 332 should accept dataset uploads in a predefined format (such as csv or arff file formats) and provide each uploaded dataset a unique identification. Additionally, the automated data mining component 332 can provide one or more dataset exporter helper tools, as known in the art, to end users to help them export data from their existing database to the acceptable formats.

As described above relative to the automated data mining components 332, the question-driven data mining component 334 can also automatically select the best data pre-processing and/or data mining algorithms. In order to provide time estimates for requested data mining tasks, the question-driven data mining component 334 can obtain time estimates via the API exposed by the automatic data mining component 332. Such estimate are calculated based on the input data's characteristic including size, data preparation methods selected, training scheme selected, etc. and the computing resources currently allocated for this task. This is done by first using machine learning algorithms against a learning base dataset that is large enough in size and diverse enough in data characteristics to best reflect the general data mining task characteristics. After learning on this dataset, the question-driven data mining component 334 will develop a model that can be used for time estimation. Improvements to the time estimate learning model may be provided through the collection of all user inputs following initial training and deployment; by periodically rerunning the machine learning algorithm, precision of the model may be continually increased.

As noted above, the question-driven data mining component 334 may accept requests expressed in natural language, which requests may be further processed by the NLP engine 336, which offers two major functions: Natural Language Interface To Database (NLIDB) and Natural Language Application Generation (NLAG), as described in detail below.

The NLIDB function allows end user to submit queries in natural (i.e., human understandable) language. For example, such queries often include expression like "what," "who," "how," etc., e.g., "Which state has the highest sales of our products?" and "Who earned more than $10,000.00 last year?" An NLIDB module in the NLP engine 336 parses the natural language questions and translate them into more technical query languages such as SQL, etc. or, preferably, into the unified, SQL-like API described above that, in turn, is translated into underlying data engines' native query APIs.

The NLIDB module takes an "inverse" approach to parsing natural language questions. That is, it does not parse the users' input questions using statistical parsers as such techniques frequently lead to inaccurate results. Rather, the NLIDB module system simply maps the users' input, after some preprocessing, to the available questions in a predefined question/answer table (Q&A table) which includes all "supported" questions and their corresponding answers. When implemented, the "answers" included in this Q&A table are actually queries that may be used to obtain the data that answers the associated question. The Q&A table is generated based on the available schema and data stored in databases. By applying natural language grammar rules, the NLIDB module generates all possible questions that have definite answers including variant forms of the same question. This strategy sacrifices storage capacity (needed to store this huge list), which is relatively cheaper, to gain parsing accuracy and real-time performance. Since the parsing is as simple as matching strings, the performance is very fast and achieves real-time response.

If a user's input does not match any of the supported questions, then a statistical parsing (SP) process, as known in the art, is used to make the best effort in finding the answer. The SP process firstly eliminates stop words from the question leaving only key words. The SP process then uses the keywords to perform a text search in the databases and return related data objects. However this process does not guarantee that the right answer will be found. It makes the best effort trying to get the right or related answers to the question, and could return totally unrelated answer or unformatted data that is difficult to understand. After the SP process is performed, the user is provided with a list of potential answers and a request to grade the answers, i.e. to engage in active learning. If the user finds the right answer in the returned results then he/she is requested to give that answer a good grade, something that could be as simple as a thumb up. If the user is otherwise not satisfied with any answer, he/she is requested to give a bad grade, something that could be as simple as a thumb down. If the user did not grade the answer, the grade is considered "neutral." Each and every user input is recorded. For questions that are not matched to supported questions and thus processed by SP, there is a repository designed to store corresponding records. An expert team can analyze these records and, for the mostly commonly mis-processed inputs, add the questions to the supported questions and update the Q&A table.

As mentioned above, all answerable questions based on the data stored in one or more databases may be identified through knowledge of the underlying database schema. In turn, schema fields are defined by end users. Although schema fields are usually defined in meaningful words, there is no guarantee that non-natural language words/symbols such as number, codes or meaningless characters will not be used. For schema fields with non-natural language symbols, the NLIDB module firstly tries to define the schema field's semantic meaning from the data type. If a data type is not available or does not meet the need, the NLIDB module then requires users to define their semantic meanings. For example, this could be done via the minor developer interface 326 described above.

For the interpretable schema field names, the NLIDB module looks up the words in an ontology definition, i.e., a description of the structure used in the underlying ontology. Once a meaning is located, the NLIDB module starts to expand the list of aliases that can be used as alternatives to the word in users' queries. This expansion can be performed in a number of different ways. According to one method, upper level ontology definitions are used as aliases. For example, an "employee" is the same thing as a "person." According to another method, thesauruses may be used to identify known synonyms. Conversely, according to another method, antonyms can be identified for a given word using a dictionary of antonyms. This method is especially useful for verbs because a verb can be used as a combination of a privative and its antonyms, e.g., "broken" and "non-functioning" may refer to the same meaning. Using a combination of these methods, the NLIDB module can build an alias list for a specific word in the schema. Furthermore, to expand the number of words available for alias identification using the above-noted techniques, it may be desirable to resolve the meanings of abbreviations. For example, "P.O." could mean many things, but in a purchasing department application, it likely means "Purchase Order" and would be so defined in a list of abbreviation definitions including this context. If the context is not enough, disambiguation can be achieved by presenting a user with a list of available options.

After schema words and their aliases are discovered, the NLIDB module starts to assemble potential questions based on the schema words and their relationships. To this end, it uses both the ontology information and natural language syntax. A word's ontology information can be directly mapped to question words. For example, if a schema word such as "DOB" is of type "time," then the question "When . . . ?" should be generated. Schema fields' relationships to each other is another important base for generating questions. For example, if an employee data object contains a "name" field and a "DOB" field, then the question "What is the date of birth of John Doe?" or "When was John Doe born?" can be generated. Additionally, besides mapping field names to question words, the NLIDB module also maps them to command words such as "Show me," "I need to know", "Give me", etc. This mapping generates "questions" that do not start with question words.

After the questions are generated, their corresponding queries are generated accordingly. For example, the question "What is the date of birth of John Doe" has the corresponding SQL query "SELECT DOB FROM Employee WHERE Name='John Doe'" This query is served as the 'answer' and stored in the Q&A table along with the natural language question.

In use, the NLP engine 336 allow an end user to enter a question through, for example, a text box. Autocompletion may be used to suggest what questions are available. If the user types in a word which together with the previously typed words do not match any available questions in the Q&A table, then the autocompletion will show an empty list to warn the user that a potentially unsupported question has been input. Users' input word by word using spell checking services. If a word with a typo is identified, then it may be highlighted in some way, e.g., by showing it in color. The user can correct it by using one of the suggested words, or leave it alone. If the user types a question that does not follow formal natural language syntax (e.g. English grammar), the user can be allowed to finish typing and then provided with a list of suggested questions that are similar to the user input, but that are syntactically correct.

If the user input does match an available question, the NLIDB modules searches the question in the Q&A table, locates the "answer" which is stored in the form of a database query, executes the query against database, and then returns the result back to the end user. If an user input does not match to an available question, then statistical processing, as described above, is employed.

With regard to the NLAG function, the same methodology described above relative to the NLIDB function is employed, with the exception that schema fields are replaced by application module keywords, and questions are replaced by function description statements. That is, the NLAG function helps users (e.g., minor developer interface users, etc.) generate applications based on natural language descriptions. An application is assembled by functional modules or components, with each module achieving a sub functionality. The description of the application should explain the expected functionality of the application or what the application should accomplish. Examples include "I need a program that manages my employees" or more specific ones like "I want an application from which I can add, edit, update and delete employee information, accept P.O.s, and view assembly line status." These descriptions reveal either high level or hierarchical functional requirements.

By utilizing ontology dictionaries, an NLAG module within the NLP engine 336 recognizes the different levels of requirements. To support this function, the authors of application modules (e.g., widgets, as described above) must provide a description of the module's functionality in the format of a verb-noun pattern. For example, an employee management module could have the description "manage employees" while an assembly line dashboard module could have the description "render assembly line status." These verb-noun pairs are then looked up in ontology dictionaries, and the same process described above with respect to the NLIDB function is performed, including alias expansion, question (statement in this case) generation, and query (module assembly in this case) generation. The question (statement) parsing phase is also similar in terms of limiting user input by autocompletion and statistical processing of unmatched inputs. After a user's input has been successfully parsed and a list of modules returned, the applicable development tool (e.g., the minor developer interface 326) allows the user to assemble the modules into an unified application, as described above.

Finally, a report engine component 340 is provided. In an embodiment, the report engine component is a sub-component of minor developer interface 326. In particular, it is a GUI report builder that allows users to build reports by first generating a grand table that contains all (selected) data in the system. From the grand table, users can remove columns, add aggregate functions (e.g. sum, average, etc.) to columns, or add new columns based on calculations on existing columns resulting in a new table. This process may be repeated until the final desired table is acquired. Having set up this table, users can view all tables in one screen and the report engine component 340 visualizes the relationships between table columns. Additionally, users can establish a report update frequency so that the report engine component 340 does not have to perform an update every time a constituent data element is updated.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

APPENDIX

1. Data Upload API
URL
https://www.beulahworks.com/dm/v1/data_upload
POST Request Required Fields
POST/dm/v1/data_upload HTTP/1.1
Content-Type: text/csv
Content-Length: 3876502
Charset: utf-8
Accept-Charset: utf-8
Host: www.beulahworks.com:1234 (configurable)
Filename: "abc.arff"
{Data File}
The Content-Type field should have the MIME type of all supported data file formats, including CSV: text/csv
ARFF: application/vnd.arff (Custom MIME type; can be set in web server)
The size of the data file is not limited. It can be set in web server configuration files.
POST Response Required Fields
HTTP/1.1 200 OK
Content-Type: application/json; charset=utf-8
{Response JSON}

| Response JSON Schema |
|---|
| {<br>  "type": "object",<br>  "$schema": "http://json-schema.org/draft-03/schema",<br>  "required": true,<br>  "properties": {<br>    "statusCode": {<br>      "type": "string",<br>      "required": true<br>    },<br>    "statusDescription": {<br>      "type": "string",<br>      "required": true<br>    },<br>    "status": {<br>      "type": "string",<br>      "required": true,<br>      "enum": [<br>        "success",<br>        "failure"<br>      ]<br>    },<br>    "transactionId": {<br>      "type": "string",<br>      "required": true<br>    },<br>    "transactionTime": {<br>      "type": "string",<br>      "required": true<br>    }, |

| Response JSON Schema |
|---|
| ```
"datasetId": {
   "type": "string",
   "required": true
   }
  }
}
``` |

| Response JSON Example |
|---|
| ```
{
  "status": "success",
  "statusCode": "0",
  "statusDescription": "Success",
  "transactionTime": "2013-12-10T03:08:23:63Z",
  "transactionId": "241b9632-ebfb-4be2-9d6d-64910f995182",
  "datasetId": "FBADDC8E-4007-4901-9CBF-328318E83DC5",
}
``` | where "datasetId" will be used to in following API methods.

2. Training API

A. Classification Training

URL https://www.beulahworks.com/dm/v1/classification_train

POST Request Required Fields

Same as https://www.beulahworks.com/dm/v1/classification_train.

| Request JSON Schema |
|---|
| ```
{
  "type":"object",
  "$schema": "http://json-schema.org/draft-03/schema",
  "id": "http://jsonschema.net",
  "required":false,
  "properties":{
    "algorithm":{
      "type":"array",
      "id": "http://jsonschema.net/algorithm",
      "required":false,
      "items":
        {
          "type":"object",
          "id": "http://jsonschema.net/algorithm/0",
          "required":false,
          "properties":{
            "name": {
              "type":"string",
              "id": "http://jsonschema.net/algorithm/0/name",
              "required":false
            },
            "options": {
              "type":"object",
              "id": "http://jsonschema.net/algorithm/0/options",
              "required":false,
              "properties":{
                "prune": {
                  "type":"boolean",
                  "id": "http://jsonschema.net/algorithm/0/options/prune",
                  "required":false
                }
              }
            }
          }
        }
    },
    "classAttributeName": {
      "type":"string",
      "id": "http://jsonschema.net/classAttributeName",
      "required":false
    },
``` |

| Request JSON Schema |
|---|
| ```
"datasetId": {
   "type":"string",
   "id": "http://jsonschema.net/datasetId",
   "required":true
  },
  "modelName": {
   "type":"string",
   "id": "http://jsonschema.net/modelName",
   "required":true
  },
  "preprocessor": {
   "type":"array",
   "id": "http://jsonschema.net/preprocessor",
   "required":false,
   "items":
    {
     "type":"object",
     "id": "http://jsonschema.net/preprocessor/0",
     "required":false,
     "properties":{
      "name": {
       "type":"string",
       "id": "http://jsonschema.net/preprocessor/0/name",
       "required":false
      },
      "options": {
       "type":"object",
       "id": "http://jsonschema.net/preprocessor/0/options",
       "required":false,
       "properties":{
        "removeAttriIndex": {
         "type":"number",
         "id": "http://jsonschema.net/preprocessor/0/options/removeAttriIndex",
         "required":false
        }
       }
      },
      "type": {
       "type":"string",
       "id": "http://jsonschema.net/preprocessor/0/type",
       "required":false
      }
     }
    }
  }
}
``` |

| Request JSON Example |
|---|
| ```
{
  "datasetId": "FBADDC8E-4007-4901-9CBF-328318E83DC5",
  "preprocessor": [
    {
      "name": "Remove",
      "type": "filter",
      "options": {
        "removeAttriIndex": 2
      }
    }
  ],
  "algorithm": [
    {
      "name": "J48",
      "options": {
        "prune": false
      }
    }
  ],
  "classAttributeName": "Gender",
  "modelName": "GenderPredictor"
}
``` | where "classAttributeName" is not required when the dataset was upload as an ARFF file; "algorithm" and "preprocessor" are not required for automated data mining; "algorithm" and "preprocessor" are of type array, which mean the API supports multiple proprocessor and algorithms. If multiple preprocessor is specified, then all of them are applied to the dataset; If multiple algorithms are specified, then the algorithms are applied to the dataset separately and averaged result will be reported.

POST Response Required Fields

HTTP/1.1 200 OK

Content-Type: application/j son; charset=utf-8

{Response JSON}

---
Response JSON Schema
---

```
{
  "type": "object",
  "$schema": "http://json-schema.org/draft-03/schema",
  "required": true,
  "properties": {
    "statusCode": {
      "type": "string",
      "required": true
    },
    "statusDescription": {
      "type": "string",
      "required": true
    },
    "status": {
      "type": "string",
      "required": true,
      "enum": [
        "success",
        "failure"
      ]
    },
    "transactionId": {
      "type": "string",
      "required": true
    },
    "transactionTime": {
      "type": "string",
      "required": true
    },
    "jobId": {
      "type": "string",
      "required": true
    }
  }
}
```

---
Response JSON Example
---

```
{
  "status": "success",
  "statusCode": "0",
  "statusDescription": "Success",
  "transactionTime": "2013-12-100:08:23:63Z",
  "transactionId": "241b9632-ebfb-4be2-9d6d-64910f995182",
  "jobId": "FBADDC8E-4007-4901-9CBF-328318E83DC5"
}
``` where "statusCode" and "statusDescription' are sets of predefined standard success/error messages; "transaction Time" is a UTC time when the API method issues response; transactionID is an UUID that will be used for logging and partitioning purposes; jobId will be used by other API methods to check a specific job's estimation time.

B. Clustering Training

URL https://www.beulahworks.com/dm/v1/clustering_train

POST Request Required Fields

Same as https://www.beulahworks.com/dm/v1/classification_train.

---
Request JSON Schema
---

```
{
  "type": "object",
  "$schema": "http://json-schema.org/draft-03/schema",
  "id": "http://jsonschema.net",
  "required": false,
  "properties": {
    "algorithm": {
      "type": "array",
      "id": "http://jsonschema.net/algorithm",
      "required": false,
      "items":
        {
          "type": "object",
          "id": "http://jsonschema.net/algorithm/0",
          "required": false,
          "properties": {
            "name": {
              "type": "string",
              "id": "http://jsonschema.net/algorithm/0/name",
              "required": false
            },
            "options": {
              "type": "object",
              "id": "http://jsonschema.net/algorithm/0/options",
              "required": false,
              "properties": {
                "numClusters": {
                  "type": "number",
                  "id": "http://jsonschema.net/algorithm/0/options/numClusters",
                  "required": false
                }
              }
            }
          }
        }
    },
    "datasetId": {
      "type": "string",
      "id": "http://jsonschema.net/datasetId",
      "required": true
    },
    "preprocessor": {
      "type": "array",
      "id": "http://jsonschema.net/preprocessor",
      "required": false,
      "items":
        {
          "type": "object",
          "id": "http://jsonschema.net/preprocessor/0",
          "required": false,
          "properties": {
            "name": {
              "type": "string",
              "id": "http://jsonschema.net/preprocessor/0/name",
              "required": false
            },
            "options": {
              "type": "object",
              "id": "http://jsonschema.net/preprocessor/0/options",
              "required": false,
              "properties": {
                "removeAttriIndex": {
                  "type": "number",
                  "id": "http://jsonschema.net/preprocessor/0/options/removeAttriIndex",
                  "required": false
                }
              }
            },
```

| Request JSON Schema |
|---|
| ```
            "type": {
                "type":"string",
                "id":
"http://jsonschema.net/preprocessor/0/type",
                "required":false
            }
        }
    }
  }
}
``` |

| Request JSON Example |
|---|
| ```
{
    "datasetId": "FBADDC8E-4007-4901-9CBF-328318E83DC5",
    "preprocessor": [
        {
            "name": "Remove",
            "type": "filter",
            "options": {
                "removeAttriIndex": 2
            }
        }
    ],
    "algorithm": [
        {
            "name": "K-Means",
            "options": {
                "numClusters": 5
            }
        }
    ]
}
``` |

Response POST Required Fields
Same as https://www.beulahworks.com/dm/v1/classification_train.
Response JSON Schema
Same as https://www.beulahworks.com/dm/v1/classification_train.
Response JSON Example
Same as https://www.beulahworks.com/dm/v1/classification_train.
C. Association Rule Discovery Training
URL
https://www.beulahworks.com/dm/v1/association_rule_train
POST Request Required Fields
Same as https://www.beulahworks.com/dm/v1/classification_train.

Request JSON Schema
```
{
    "type":"object",
    "$schema": "http://json-schema.org/draft-03/schema",
    "id": "http://jsonschema.net",
    "required":false,
    "properties":{
        "algorithm": {
            "type":"array",
            "id": "http://jsonschema.net/algorithm",
            "required":false,
            "items":
                {
                    "type":"object",
                    "id": "http://jsonschema.net/algorithm/0",
                    "required":false,
                    "properties":{
                        "name": {
                            "type":"string",
                            "id":
"http://jsonschema.net/algorithm/0/name",
                            "required":false
                        },
                        "options": {
                            "type":"object",
                            "id":
"http://jsonschema.net/algorithm/0/options",
                            "required":false,
                            "properties":{
                                "numRules": {
                                    "type":"number",
                                    "id":
"http://jsonschema.net/algorithm/0/options/numRules",
                                    "required":false
                                }
                            }
                        }
                    }
                }
        },
        "datasetId": {
            "type":"string",
            "id": "http://jsonschema.net/datasetId",
            "required":true
        },
        "preprocessor": {
            "type":"array",
            "id": "http://jsonschema.net/preprocessor",
            "required":false,
            "items":
                {
                    "type":"object",
                    "id": "http://jsonschema.net/preprocessor/0",
                    "required":false,
                    "properties":{
                        "name": {
                            "type":"string",
                            "id":
"http://jsonschema.net/preprocessor/0/name",
                            "required":false
                        },
                        "options": {
                            "type":"object",
                            "id":
"http://jsonschema.net/preprocessor/0/options",
                            "required":false,
                            "properties":{
                                "removeAttriIndex": {
                                    "type":"number",
                                    "id":
"http://jsonschema.net/preprocessor/0/options/removeAttriIndex",
                                    "required":false
                                }
                            }
                        },
                        "type": {
                            "type":"string",
                            "id":
"http://jsonschema.net/preprocessor/0/type",
                            "required":false
                        }
                    }
                }
        }
    }
}
```
Request JSON Example
```
{
    "datasetId": "FBADDC8E-4007-4901-9CBF-328318E83DC5",
    "preprocessor": [
        {
            "name": "Remove",
            "type": "filter",
            "options": {
                "removeAttriIndex": 2
            }
        }
    ],
```

```
        "algorithm": [
            {
                "name": "Apriori",
                "options": {
                    "numRules": 10
                }
            }
        ]
}
```

Response POST Required Fields
Same as https://www.beulahworks.com/dm/v1/classification_train.
Response JSON Schema
Same as https://www.beulahworks.com/dm/v1/classification_train.
Response JSON Example
Same as https://www.beulahworks.com/dm/v1/classification_train.

E. Regression (Prediction) Training
URL
https://www.beulahworks.com/dm/v1/regression_train
POST Request Required Fields
Same as https://www.beulahworks.com/dm/v1/classification_train.
Request JSON Schema
Same as https://www.beulahworks.com/dm/v1/classification_train.
Request JSON Example
Same as https://www.beulahworks.com/dm/v1/classification_train.
Response POST Required Fields
Same as https://www.beulahworks.com/dm/v1/classification_train.
Response JSON Schema
Same as https://www.beulahworks.com/dm/v1/classification_train.
Response JSON Example
Same as https://www.beulahworks.com/dm/v1/classification_train.

F. Estimate Time
URL
https://www.beulahworks.com/dm/v1/estimate_time
POST Request Required Fields
Same as https://www.beulahworks.com/dm/v1/classification_train.

Request JSON Schema
```
{
        "type":"object",
        "$schema": "http://json-schema.org/draft-03/schema",
        "required":true,
        "properties":{
                "jobId": {
                        "type":"string",
                        "required":true
                }
        }
}
```
Request JSON Example
```
{
        "jobId": "FBADDC8E-4007-4901-9CBF-328318E83DC5"
}
```

Response POST Required Fields
Same as https://www.beulahworks.com/dm/v1/classification_train.

Response JSON Schema
```
{
        "type": "object",
        "$schema": "http://json-schema.org/draft-03/schema",
        "id": "http://jsonschema.net",
        "required": true,
        "properties": {
                "estimatedFinishDate": {
                        "type": "string",
                        "id": "http://jsonschema.net/estimatedFinishDate",
                        "required": true
                },
                "estimatedTime": {
                        "type": "string",
                        "id": "http://jsonschema.net/estimatedTime",
                        "required": true
                },
                "jobId": {
                        "type": "string",
                        "id": "http://jsonschema.net/jobId",
                        "required": true
                },
                "statusCode": {
                        "type": "string",
                        "id": "http://jsonschema.net/statusCode",
                        "required": true
                },
                "statusDescription": {
                        "type": "string",
                        "id": "http://jsonschema.net/statusDescription",
                        "required": true
                },
                "status": {
                        "type": "string",
                        "id": "http://jsonschema.net/status",
                        "required": true,
                        "enum": [
                                "success",
                                "failure"
                        ]
                },
                "transactionID": {
                        "type": "string",
                        "id": "http://jsonschema.net/transactionID",
                        "required": true
                },
                "transactionTime": {
                        "type": "string",
                        "id": "http://jsonschema.net/transactionTime",
                        "required": true
                }
        }
}
```
Response JSON Example
```
{
        "status": "success",
        "statusCode": "0",
        "statusDescription": "Success",
        "jobId": "FBADDC8E-4007-4901-9CBF-328318E83DC5",
        "estimatedTime": "1 hour 30 minutes",
        "estimatedFinishDate": "2013-12-10T04:38:23:63Z",
        "transactionTime": "2013-12-10T03: 08: 23: 63Z",
        "transactionID": "241b9632-ebfb-4be2-9d6d-64910f995182"
}
```

Besides the same fields in https://www.beulahworks.com/dm/v1/classification_train.s, "jobId" is a confirmation of the job being estimated against; "estimatedTime" shows the estimated time during of the selected job; "estimatedFinishDate" indicates the estimated data and time that the selected job will be completed, if no error occured.

G. Callback POST
URL
https://www.beulahworks.com/dm/v1/callback
POST Request Required Fields
POST callback_url(configurable) HTTP/1.1
Content-Type: application/json Charset: utf-8
Accept-Charset: utf-8
Host: callback_host (configurable)
{Request JSON}

---

Request JSON Schema
```
{
    "type": "object",
    "$schema": "http://json-schema.org/draft-03/schema",
    "required": true,
    "properties": {
        "dataPreparationInfo": {
            "type": "object",
            "required": false,
            "properties": {
                "mode": {
                    "type": "string",
                    "required": true
                },
                "schemes": {
                    "type": "object",
                    "required": true,
                    "properties": {
                        "nullDataHandling": {
                            "type": "string",
                            "required": true
                        },
                        "outlierRemoval": {
                            "type": "string",
                            "required": true
                        }
                    }
                }
            }
        },
        "jobId": {
            "type": "string",
            "required": true
        },
        "modelName": {
            "type": "string",
            "required": true
        },
        "statusCode": {
            "type": "string",
            "required": true
        },
        "statusDescription": {
            "type": "string",
            "required": true
        },
        "status": {
            "type": "string",
            "required": true,
            "enum": [
                "success",
                "failure"
            ]
        },
        "trainingInfo": {
            "type": "object",
            "required": true,
            "properties": {
                "attributeNum": {
                    "type": "string",
                    "required": true
                },
                "attributes": {
                    "type": "array",
                    "required": true,
                    "items": {
                        "type": "string",
                        "required": false
                    }
                },
                "correctlyClassifiedInstancePercentage": {
                    "type": "string",
                    "required": true
                },
```

-continued
```
                "correctlyClassifiedInstancesNum": {
                    "type": "number",
                    "required": true
                },
                "folds": {
                    "type": "number",
                    "required": false
                },
                "incorrectlyClassifiedInstanceNum": {
                    "type": "number",
                    "required": true
                },
                "incorrectlyClassifiedInstancePercentage": {
                    "type": "string",
                    "required": true
                },
                "instanceNum": {
                    "type": "string",
                    "required": true
                },
                "scheme": {
                    "type": "string",
                    "required": true
                },
                "testMode": {
                    "type": "string",
                    "required": true
                }
            }
        }
    }
}
```
Request JSON Example
```
{
    "jobId": "FBADDC8E-4007-4901-9CBF-328318E83DC5",
    "status": "success",
    "statusCode": "0",
    "statusDescription": "Success.",
    "modelName": "activeCustomer_classification",
    "dataPreparationInfo": {
        "mode": "automatic",
        "schemes": {
            "outlierRemoval": "Gaussian distribution",
            "nullDataHandling": "Arithmatic mean"
        }
    },
    "trainingInfo": {
        "scheme": "weka.classifiers.rules.ZeroR",
        "instanceNum": "300",
        "attributeNum": "3",
        "attributes": [
            "764e2634",
            "852d7435",
            "279h0236"
        ],
        "testMode": "cross validation",
        "folds": 10,
        "correctlyClassifiedInstancesNum": 250,
        "correctlyClassifiedInstancePercentage": "83.3333%",
        "incorrectlyClassifiedInstanceNum": 50,
        "incorrectlyClassifiedInstancePercentage": "16.6667%"
    }
}
```

---

Response POST Required Fields
Same as https://www.beulahworks.com/dm/v1/classification_train.

---

Response JSON Schema
```
{
    "type": "object",
    "$schema": "http://json-schema.org/draft-03/schema",
    "required": true,
    "properties": {
        "statusCode": {
            "type": "string",
            "required": true
        },
```

-continued

```
        "statusDescription": {
            "type": "string",
            "required": true
        },
        "status": {
            "type": "string",
            "required": true,
            "enum": [
                "success",
                "failure"
            ]
        },
        "transactionID": {
            "type": "string",
            "required": true
        },
        "transactionTime": {
            "type": "string",
            "required": true
        },
        "jobId": {
            "type": "string",
            "required": false
        }
    }
}
Response JSON Example
{
    "status": "success",
    "statusCode": "0",
    "statusDescription": "Success",
    "transactionTime": "2013-12-10T03:08:23:63Z",
    "transactionID": "241b9632-ebfb-4be2-9d6d-64910f995182",
    "jobId": "FBADDC8E-4007-4901-9CBF-328318E83DC5"
}
```

3. Usage API

Usage APIs are the same as the training APIs, except:
1. The URL is different. "train" is replaced with "use". e.g.
   "https://www.beulahworks.com/dm/v1/classification_train" becomes
   "https://www.beulahworks.com/dm/v1/classification_use". So are other usage APIs.
2. "model" field is optional. If "model" is not provided, then the system uses the grand machine learning model to execute the task.

What is claimed is:

1. A system comprising:
   a knowledge repository, implemented by at least one processing device, in which input data is stored as objects and relationships between objects, wherein each object represents at least one container of one or more properties, and wherein the knowledge repository is capable of storing the input data according to more than one storage format;
   a user interface, implemented by the at least one processing device, providing an input mechanism to obtain the input data, object information that defines one or more of the properties, and relationship information that defines one or more of the relationships; and
   a controller, implemented by the at least one processing device and connected to the knowledge repository and the user interface, wherein the controller is configured to receive the input data, the object information, and the relationship information from the user interface, cause the input data to be stored in the knowledge repository as at least one object based on the object information and the relationship information, and identify relationships between objects represented in the knowledge repository, including one or more relationships that are not defined in the received relationship information, that enable or restrict achievement of an identified goal, wherein the relationships between the objects establish an object social network.

2. The system of claim 1, wherein the knowledge repository is configured to store the input data in a first database having a first storage format and selectively cause at least a portion of the input data to be converted from the first storage format to at least one second storage format and stored in at least one second database implementing the at least one second storage format.

3. The system of claim 2, wherein the second database comprises any one or more of: a relational database, a columnar database, a graph database, a key-value database, a document database and a file storage database.

4. The system of claim 2, wherein the controller is configured to instruct the knowledge repository to convert the portion of the input data from the first storage format to the second storage format based on at least one data characteristic of the input data.

5. The system of claim 4, wherein the at least one data characteristic of the input data comprises any or more of: data size and data schema.

6. The system of claim 4, wherein the at least one data characteristic of the input data comprises any one or more of: required data freshness and required data retention.

7. The system of claim 2, wherein the controller is configured to instruct the knowledge repository to convert the portion of the input data from the first storage format to the second storage format based on at least one usage characteristic of the input data.

8. The system of claim 7, wherein the at least one usage characteristic of the input data comprises any one or more of: frequency of data writes, frequency of data updates, frequency of data reads, data read request types and concurrency of users.

9. The system of claim 1, wherein the user interface is a hierarchical user interface in a set of hierarchical user interfaces.

10. The system of claim 9, wherein the set of hierarchical user interfaces comprises at least one major developer interface and a minor developer interface.

11. The system of claim 10, wherein the at least one major developer interface includes a first major developer interface comprising an integrated development environment supporting the development of software components.

12. The system of claim 10, wherein the at least one major developer interface includes a second major developer interface comprising a graphical user interface (GUI)-based platform supporting the development of any one or more of GUI applications and software widgets.

13. The system of claim 10, wherein the minor developer interface comprises a graphical user interface configured to construct an application metafile based on software widgets.

14. The system of claim 13, further comprising a code generator connected to the controller and the minor developer interface, wherein the code generator is configured to generate an executable application based on the application metafile.

15. The system of claim 1, wherein the controller is further configured to:
   generate machine-readable user data queries based on human-readable user data queries; and
   generate application metadata based on human-readable application specifications.

16. The system of claim 1, wherein the controller further comprises a data mining component configured to retrieve stored data from the knowledge repository based on a machine-readable user data query.

17. A system comprising:
- a controller implemented by at least one processing device, wherein the controller is configured to:
- store input data, received via a hierarchical user interface, in a first storage format in at least a first database of a knowledge repository, the input data being stored as objects and relationships between objects, wherein each object represents at least one container of one or more properties;
- convert at least a portion of the input data stored in the first database to at least a second storage format to store the input data in a second database of the knowledge repository, the first and second storage formats being different storage formats;
- identify relationships between objects represented in the knowledge repository, including one or more relationships that are not defined in the input data, that enable or restrict achievement of an identified goal, wherein the relationships between the objects establish an object social network; and
- receive, from the hierarchical user interface or a second hierarchical user interface, a query to access the input data, object information that defines one or more of the properties, and relationship information that defines one or more of the relationships.

18. The system of claim 17, wherein the controller is further configured to analyze the relationships between the objects and create a network representation of the objects and the relationships therebetween.

19. A method for analyzing data, the method comprising:
- identifying, by a processing device, a goal to be achieved;
- analyzing, by the processing device, an ontological structure of data in a database complex and determining a context of the data;
- identifying, by the processing device and based on the analysis, relationships between objects represented in the data that enable or restrict achievement of the goal, wherein the relationships between the objects establish an object social network;
- analyzing, by the processing device, subsequent data in the database, wherein the subsequent data was produced from the execution of a process to achieve the goal after the identification of the relationships between the objects that enable or restrict achievement of the goal; and
- modifying, based on the analysis of the subsequent data, the object social network to increase the achievement of the goal.

20. The method of claim 19, wherein modifying the object social network comprises modifying, creating, or removing at least one relationship that is indicative of a causal relationship or a correlational relationship between two or more objects.

21. The method of claim 19, wherein the goal is representative of an efficiency with which the process is performed.

22. The method of claim 19, wherein analyzing comprises performing a root cause analysis.

23. The method of claim 19, wherein analyzing comprises performing a neural network analysis or a regression analysis.

24. One or more machine-readable media having stored thereon executable instructions that, when executed by the at least one processing device, cause the at least one processing device to:
- identify a goal to be achieved;
- analyze an ontological structure of data in a database complex and determine a context of the data;
- identify, based on the analysis, relationships between objects represented in the data that enable or restrict achievement of the goal, wherein the relationships between the objects establish an object social network;
- analyze subsequent data in the database, wherein the subsequent data was produced from the execution of a process to achieve the goal after the identification of the relationships between the objects that enable or restrict achievement of the goal; and
- modify, based on the analysis of the subsequent data, the object social network to increase the achievement of the goal.

25. The one or more machine-readable media of claim 24, wherein to modify the object social network comprises to modify, create, or remove at least one relationship that is indicative of a causal relationship or a correlational relationship between two or more objects.

26. The one or more machine-readable media of claim 24, wherein the goal is representative of an efficiency with which the process is performed.

27. The one or more machine-readable media of claim 24, wherein to analyze comprises to perform a root cause analysis.

28. The one or more machine-readable media of claim 24, wherein the instructions further cause the processing device to update the goal to be achieved.

29. The one or more machine-readable media of claim 24, wherein to modify the object social network comprises to combine at least two relationships that are indicative of a causal relationship or a correlational relationship between two or more objects.

30. The one or more machine-readable media of claim 24, wherein to increase the achievement of the goal comprises to increase an optimization of the process.

31. The one or more machine-readable media of claim 24, wherein at least one of the objects contains multiple objects.

32. The one or more machine-readable media of claim 31, wherein the at least one object additionally contains at least one relationship among the multiple objects.

33. The one or more machine-readable media of claim 24, wherein each object represents a corresponding object social network.

34. The one or more machine-readable media of claim 24, wherein a relationship is represented by an object.

35. The one or more machine-readable media of claim 24, wherein the instructions further cause the processing device to produce an inference or a prediction based on the data or the subsequent data.

36. The method of claim 19, further comprising updating, by the processing device, the goal to be achieved.

37. The method of claim 19, wherein modifying the object social network comprises combining at least two relationships that are indicative of a causal relationship or a correlational relationship between two or more objects.

38. The method of claim 19, wherein increasing the achievement of the goal comprises increasing an optimization of the process.

39. The method of claim 19, wherein at least one of the objects contains multiple objects.

40. The method of claim 39, wherein the at least one object additionally contains at least one relationship among the multiple objects.

41. The method of claim 19, wherein each object represents a corresponding object social network.

42. The method of claim 19, wherein a relationship is represented by an object.

43. The method of claim 19, further comprising producing, by the processing device, an inference or a prediction based on the data or the subsequent data.

* * * * *